United States Patent
Sato

(10) Patent No.: US 10,556,262 B2
(45) Date of Patent: Feb. 11, 2020

(54) REPLACEMENT METHOD FOR ATTACHING AND DETACHING TOOL FOR PRESS BRAKE AND TOOL STORAGE DEVICE

(71) Applicant: AMADA HOLDINGS CO., LTD., Kanagawa (JP)

(72) Inventor: Masaaki Sato, Kanagawa (JP)

(73) Assignee: AMADA HOLDINGS CO., LTD., Kanagawa (JP)

( * ) Notice: Subject to any disclaimer, the term of this patent is extended or adjusted under 35 U.S.C. 154(b) by 0 days.

(21) Appl. No.: 15/516,957

(22) PCT Filed: Jul. 3, 2015

(86) PCT No.: PCT/JP2015/069235
§ 371 (c)(1),
(2) Date: Apr. 5, 2017

(87) PCT Pub. No.: WO2016/063579
PCT Pub. Date: Apr. 28, 2016

(65) Prior Publication Data
US 2017/0297073 A1    Oct. 19, 2017

(30) Foreign Application Priority Data
Oct. 24, 2014  (JP) .................. 2014-216867

(51) Int. Cl.
*B21D 5/02*    (2006.01)
*B21D 37/14*    (2006.01)
*B23Q 3/155*    (2006.01)

(52) U.S. Cl.
CPC ......... *B21D 5/0254* (2013.01); *B21D 37/145* (2013.01); *B21D 37/147* (2013.01); *B23Q 3/15573* (2013.01); *Y10T 483/1731* (2015.01)

(58) Field of Classification Search
CPC ......... Y10T 483/1729; Y10T 483/1731; Y10T 483/13; Y10T 483/132; Y10T 483/134;
(Continued)

(56) References Cited

U.S. PATENT DOCUMENTS 3,359,771 A * 12/1967 Meyerchick, Jr. ..... B21D 5/042
                                                        72/319
4,930,332 A *  6/1990 Hongo ..................... B21D 5/02
                                                        483/28
(Continued)

FOREIGN PATENT DOCUMENTS

CH         668035       11/1988
DE        2844867        4/1980
(Continued)

OTHER PUBLICATIONS

International Search Report issued in WO Patent Application No. PCT/JP2015/069235, dated Sep. 1, 2015.
(Continued)

*Primary Examiner* — Sunil K Singh
*Assistant Examiner* — Yasir A Diab
(74) *Attorney, Agent, or Firm* — Greenblum & Bernstein, P.L.C.

(57) ABSTRACT

A tool storage device is disposed on a side of a press brake. In the tool storage device, a lower tool holder is lifted up from lower tool holder support members, is moved forward or backward, and both end sides in a left-and-right direction of the lower tool holder are lowered after being passed through recessed portions formed on the lower tool holder support members (step (a)). The lowered lower tool holder is conveyed forward, and is positioned to a same height as a height of a lower tool mounting portion in a lower table (step (b)). The lower tool held in the lower tool holder is transferred to the lower tool mounting portion by a tool
(Continued)

replacement device, and is mounted on the lower table (step (c)). The lower tool mounted on the lower table is returned into the tool storage device (step (d)).

5 Claims, 20 Drawing Sheets

(58) Field of Classification Search
CPC ............ Y10T 483/136; Y10T 483/138; B21D 5/0254; B23Q 3/1556; B23Q 3/15566; B23Q 3/15573
See application file for complete search history.

(56) References Cited

U.S. PATENT DOCUMENTS

| | | | | |
|---|---|---|---|---|
| 5,168,745 A * | 12/1992 | Miyagawa | ............... | B21D 5/02 483/29 |
| 6,024,681 A * | 2/2000 | Latten | ...................... | B21D 5/02 483/29 |
| 6,656,099 B1 * | 12/2003 | Akami | ..................... | B21D 5/02 483/29 |
| 6,701,208 B2 * | 3/2004 | Hwang | ............ | G05B 19/40938 700/165 |
| 2003/0019272 A1 * | 1/2003 | Harrington | .......... | B21D 5/0209 72/481.1 |
| 2007/0271987 A1 | 11/2007 | Shimizu et al. | | |
| 2009/0100896 A1 * | 4/2009 | Akami | ..................... | B21D 5/02 72/389.4 |
| 2012/0279275 A1 * | 11/2012 | Denkmeier | .............. | B21D 5/02 72/389.3 |
| 2013/0203572 A1 * | 8/2013 | Denkmeier | .......... | B21D 5/0254 483/58 |
| 2015/0160361 A1 * | 6/2015 | Gondo | ..................... | B21D 5/02 324/679 |
| 2015/0174633 A1 * | 6/2015 | Sato | ....................... | B21D 5/004 483/1 |

FOREIGN PATENT DOCUMENTS

| | | |
|---|---|---|
| JP | 52-156164 | 12/1977 |
| JP | 6-83121 U | 11/1994 |
| JP | 2003-71519 A | 3/2003 |
| JP | 4672868 B2 | 1/2011 |
| WO | 2004/112981 A1 | 12/2004 |

OTHER PUBLICATIONS

Written Opinion of the International Searching Authority in WO Patent Application No. PCT/JP2015/069235, dated Sep. 1, 2015.
Decision to Grant a Patent in JP 2014-216867, with English language translation, dated Apr. 27, 2016.

* cited by examiner

REPLACEMENT METHOD FOR ATTACHING AND DETACHING TOOL FOR PRESS BRAKE AND TOOL STORAGE DEVICE

TECHNICAL FIELD

The present disclosure relates to a tool attaching and detaching replacement method for attaching and detaching a tool for a press brake, and relates to a tool storage device.

BACKGROUND ART

As a configuration of performing attaching and detaching a replacement of an upper tool and a lower tool, which serve as tools, to upper and lower tables in a press brake, a typical configuration disposes a tool storage device that stores therein a plurality of tools, which are to be replaced, on a side position of the press brake.

The tool storage device includes a plurality of upper tool holders, which hold the upper tool and are long in the left-and-right direction, and parallel in the front-and-back direction, and includes a plurality of lower tool holders, which hold the lower tool and are long in the left-and-right direction, and parallel in the front-and-back direction.

The tool storage device positions the desired upper tool holder on a side position of an upper table in the press brake, and positions the desired lower tool holder on a side position of a lower table in the press brake (for example, refer to PTLs 1 and 2).

CITATION LIST

Patent Literature

[PTL 1] Japanese Unexamined Patent Application Publication No. 2003-71519
[PTL 2] Japanese Patent No. 4672868

SUMMARY OF THE INVENTION

A configuration described in PTL 1 is a configuration in which a tool storage device disposed on a side of a press brake moves a housing, which supports a plurality of tool holders in the front-and-back direction, and positions a desired tool holder on a side position of the upper and lower tables in the press brake. Hence, the guides which guide the housing in the front-and-back direction protrude largely from the upper and lower tables in the front direction.

A configuration described in PTL 2 includes, in an immovable state in the front-and-back direction, a storage frame, which supports a plurality of upper tool holders and is parallel in the front-and-back direction, the upper tool holders holding the upper tool and being long in the left-and-right direction. However, a slide frame, which supports lower tool holders and is parallel in the front-and-back direction, the lower tool holders holding the lower tool, is supported on guide rails so as to be movable in the front-and-back direction.

In such a configuration of moving in the front-and-back direction, the slide frame that supports the plurality of tool holders and is parallel in the front-and-back direction, and the guide rails for guiding the slide frame in the front-and-back direction protrude largely in the front direction from the upper and lower tables in the press brake.

Hence, in a configuration in which guide rails that are long in the left-and-right direction are laid on the front side of the press brake, and an industrial robot that supplies a workpiece to the press brake and carries a folded product to a desired position is disposed, the industrial robot sometimes interferes with the guide rails extended in the front-and-back direction, and a motion range of the industrial robot is sometimes restricted to result in limitations on the degree of freedom thereof.

A first aspect of the embodiments provides a replacement method for attaching and detaching a tool for a press brake, the replacement method including: (a) a step of lifting up a lower tool holder, which holds a desired lower tool in a tool storage device disposed on a side of a press brake, from a lower tool holder support member that supports a plurality of the lower tool holders parallel with one another in front-and-back direction, moving the lower tool holder forward and backward, and lowering both end sides in a left-and-right direction of the lower tool holder after passing both end sides through recessed portions formed on the lower tool holder support member; (b) a step of conveying the lowered lower tool holder forward, and positioning the lower tool holder to a same height as a height of a lower tool mounting portion in a lower table in the press brake; (c) a step of transferring the lower tool, which is held in the lower tool holder, to the lower tool mounting portion and mounting the lower tool on the lower table by a tool replacement device; and (d) a step of performing reverse operations in order of step (c), step (b), step (a), and returning the lower tool, which is mounted on the lower table, to the tool storage device.

In the above-described replacement method for attaching and detaching a tool for a press brake, a configuration may be adopted in which two lower tool holders the plurality of lower tool holders are grouped, the two lower tool holders being brought into close contact with each other in the front-and-back direction, and in step (a), when the lower tool holder on a front side in the grouped two lower tool holders is lifted up, the lower tool holder is moved forward, and when the lower tool holder on a back side is lifted up, the lower tool holder is moved backward, and the lower tool holder on the front side or the back side is lowered after being passed through the recessed portion.

A second aspect of the embodiments provides a tool storage device including: an upper tool holder support member configured to support a plurality of upper tool holders parallel with one another in a front-and-back direction, the upper tool holders holding upper tools mounted on an upper tool mounting portion, which is provided on an upper table in a press brake, so that the upper tools can be subjected to attaching and detaching replacement; an upper tool holder conveying mechanism, which is capable of lifting up a desired upper tool holder from the upper tool holder support member, conveying the upper tool holder forward, and positioning the upper tool holder to a side position of the upper tool mounting portion; a lower tool holder support member configured to support a plurality of lower tool holders parallel with one another in the front-and-back direction, the lower tool holders holding lower tools mounted on a lower tool mounting portion, which is provided on a lower table in the press brake, so that the lower tools can be subjected to the attaching and detaching replacement; and a lower tool holder conveying mechanism, which is capable of lifting up a desired lower tool holder from the lower tool holder support member, conveying the lower tool holder forward, and positioning the lower tool holder to a side position of the lower tool mounting portion, wherein the lower tool holder support member includes recessed portions, through which both end sides in a leftand-right direction of the lower tool holder are freely passable in an up-and-down direction, on a front side or back side of support portions which support both end sides in the left-and-right direction in the lower tool holders.

In the above-described tool storage device, a configuration may be adopted in which two lower tool holders in the plurality of lower tool holders are grouped, the two lower tool holders being brought into close contact with each other in the front-and-back direction, and the lower tool holder support member includes: support portions which support both end sides in the left-and-right direction in the grouped two lower tool holders; and recessed portions, through which both end sides in the left-and-right direction in the lower tool holders are passable in an up-and-down direction, the recessed portions being provided on a front side or back side of the indicators.

Preferably, the above-described tool storage device further includes: an upper tool attaching and detaching station for performing the attaching and detaching replacement of the upper tools to the upper tool holder, the upper tool attaching and detaching station being disposed on a back side of the upper tool holder support member; and a lower tool attaching and detaching station for performing the attaching and detaching replacement of the lower tools to the lower tool holder, the lower tool attaching and detaching station being disposed on a back side of the lower tool holder support member.

In the above-described tool storage device, preferably, the upper tool holders include front and back indicators, and the upper tool holder conveying mechanism includes: an upper tool holder holding member that holds the upper tool holders; and a turning mechanism that horizontally turns the upper tool holder holding member in order to invert a front and back of the upper tool holder, wherein the upper tool holder holding member includes a front and back detection mechanism that detects the front and back indicators.

In the above-described tool storage device, preferably, the upper tool holder includes positioning pins on both end sides in the left-and-right direction, and the upper tool holder holding member includes centering mechanisms on both end sides in the left-and-right direction, the centering mechanisms being capable of engaging with the positioning pins.

In accordance with the embodiments, the tool storage device disposed on the side in the press brake can perform the attaching and detaching replacement of the tool on the back side of the upper and lower tables without protruding forward from the upper and lower tables in the press brake. Hence, in a case of disposing the industrial robot, which is movable in the left-and-right direction on the front side of the press brake, the degree of freedom of the industrial robot can be increased.

MODES FOR CARRYING OUT THE INVENTION

Figure 1:
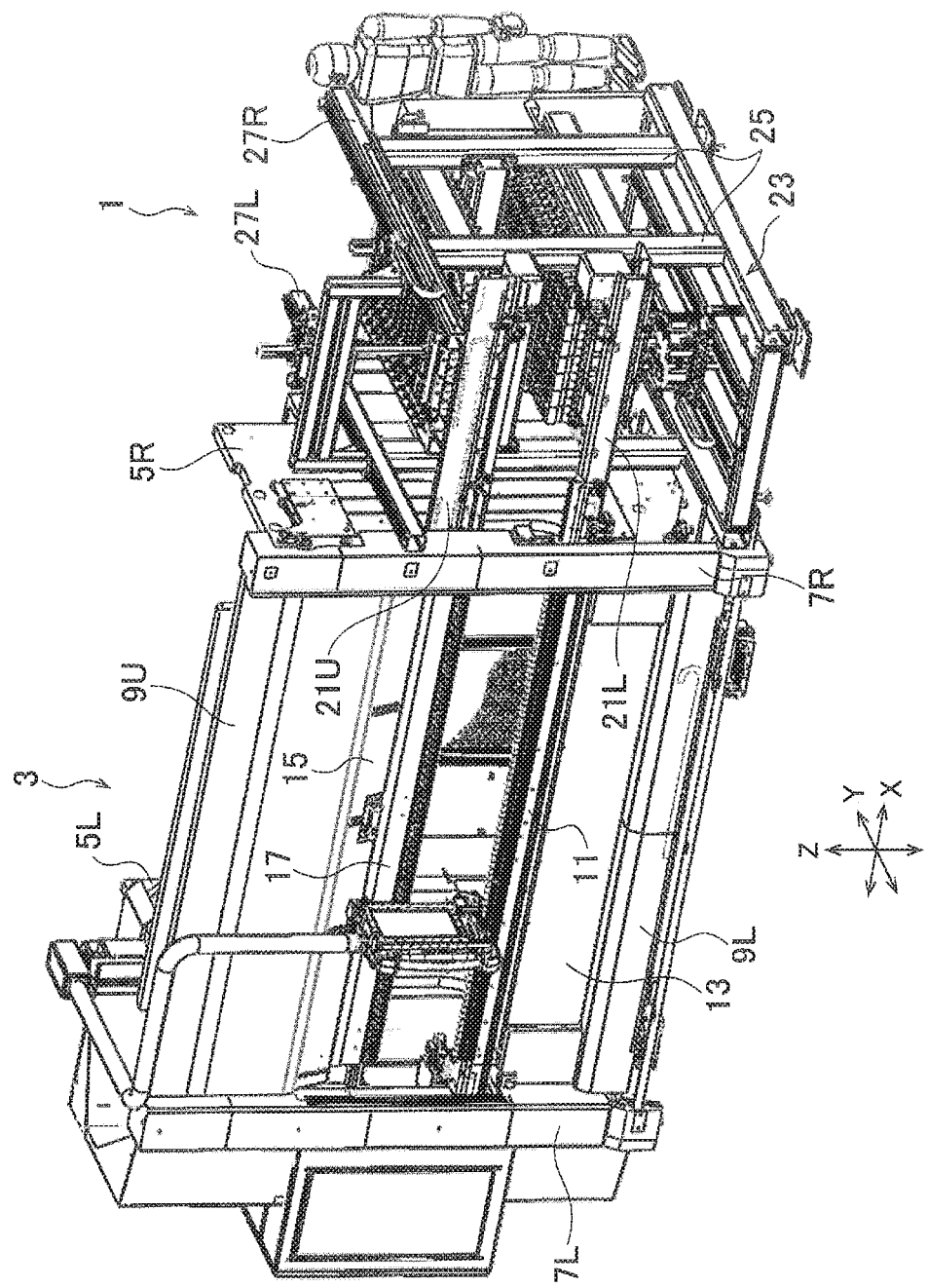
FIG. 1 is a perspective view showing a configuration in which a tool storage device according to the first embodiment is disposed on a side portion of a press brake.
Figure 2:
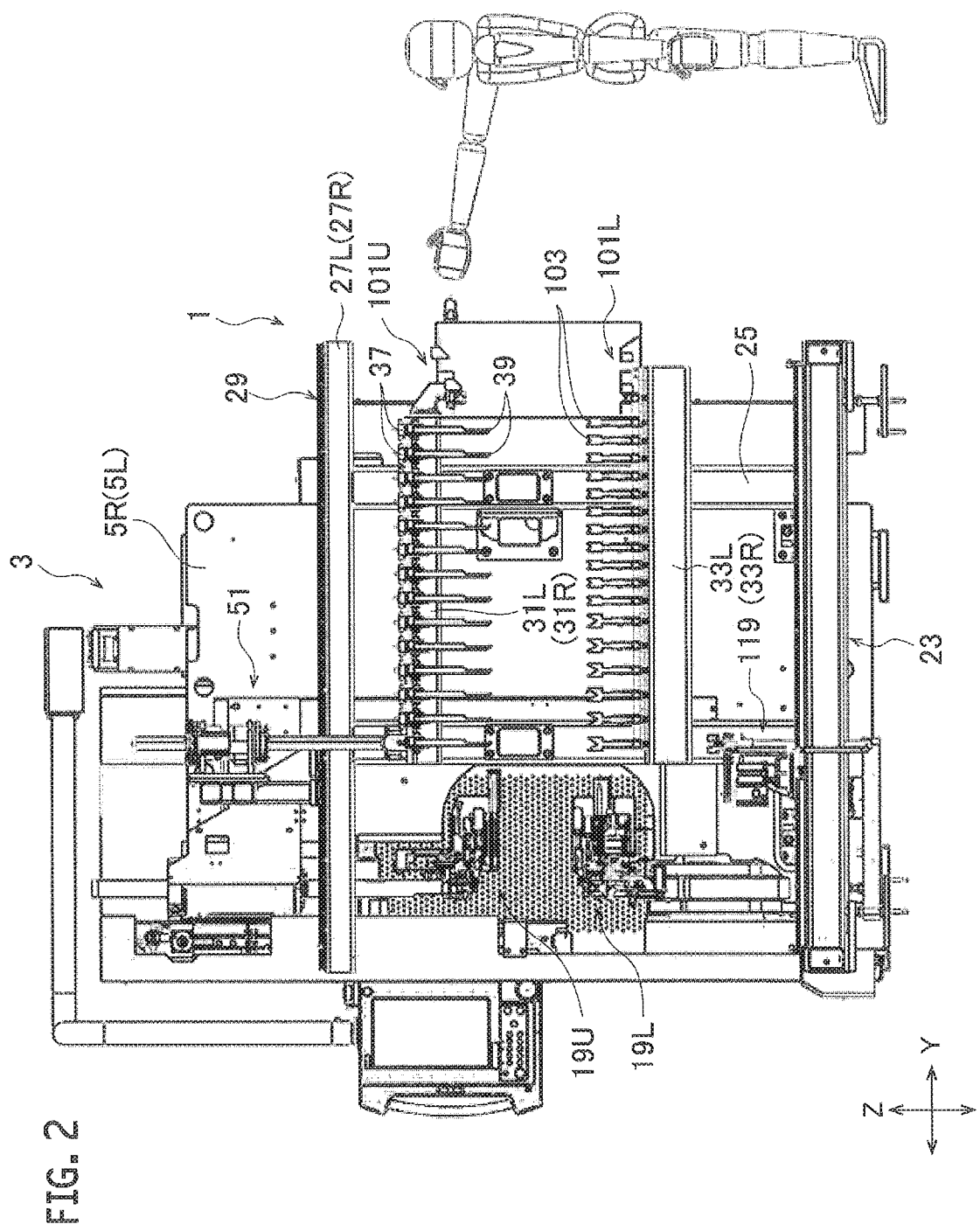
FIG. 2 is a side cross-sectional view of the tool storage device.

Referring to FIGS. 1 and 2, a tool storage device 1 according to the first embodiment is disposed on a side in a left-and-right direction (the X-axis direction) of a press brake 3. The press brake 3 has a similar configuration to that of the press brake described in PTL 2. In order to facilitate the understanding of a configuration of performing attaching and detaching replacement of a tool by the tool storage device 1, a schematic description is made of the main configuration of the press brake 3.

In a similar way to a typical press brake, the press brake 3 includes left and right side frames 5L and 5R with a C shape, and the front sides of the side frames 5L and 5R are disposed on the left and right main frames 7L and 7R, which correspond to tie rods with large rigidity. The main pillars 7L and 7R are coupled to portions less affected by deflection in the side frames 5L and 5R.

Both left and right end portions of the beam member 9U that are long in the left-and-right direction are coupled integrally with the upper portions of the main pillars 7L and 7R, and both left and right end portions of the lower beam member 9L that are long in the left-and-right direction are coupled integrally with the lower portion of the main pillars 7L and 7R. That is, the left and right main pillars 7L and 7R and the upper and lower beam members 9U and 9L are combined with one another into a quadrangular frame body.

On the front lower portions of the side frames 5L and 5R, a lower table 13, which includes, on an upper portion thereof, a lower tool mounting portion 11 that is capable of performing attaching and detaching replacement of a lower tool, is provided integrally therewith. On the front upper portions of the side frames 5L and 5R, an upper table 15 opposed to the lower table 13 in an up-and-down direction is provided so as to be movable in the up-and-down direction. On the upper table 15, there is provided an upper tool mounting portion 17 that is capable of performing the attaching and detaching replacement of an upper tool that performs folding press for a workpiece in cooperation with the lower tool.

On the upper table 15 and the lower table 13, the upper and lower tool replacement devices 19U and 19L (refer to FIG. 2) for performing the attaching and detaching replacement of the upper tool and the lower tool to the upper tool mounting portion 17 and the lower tool mounting portion 11, are provided so as to be freely capable of moving and positioning the upper and lower tool replacement devices 19U and 19L themselves in the left-and-right direction.

That is, the tool replacement devices 19U and 19L have a similar configuration to that of the tool replacement device described in PTL 2, and are movable along guide rails, which are extended in the left-and-right direction and are provided on the upper and lower tables 15 and 13.

In order that the upper and lower tool replacement devices 19U and 19L can be movable to the front side of the tool storage device 1, guide rail extended portions 21U and 21L, which are extended to the front side of the tool storage device 1, are provided on the upper and lower guide rails.

Hence, the upper and lower tool replacement devices 19U and 19L are movable in the left-and-right direction across a range from the rear positions of the upper and lower tables 15 and 13 to the front position of the tool storage device 1. Note that, as described in PTL 2, the upper and lower tool replacement devices 19U and 19L are already well-known, and accordingly, a detailed description of the upper and lower tool replacement devices 19U and 19L is omitted.

The tool storage device 1 has a structure in which a left and right pair of guide rail members 27L and 27R extended in the front-and-back direction are provided on the upper portions of a plurality of support pillars erected on a base frame 23, and an overall configuration of the tool storage device is configured in a frame body 29.

At positions below the guide members 27L and 27R in the frame body 29, the left and right pair of upper tool holder support members 31L and 31R (refer to FIGS. 2 and 3) that are long in the front-and-back direction, are provided integrally and horizontally with the frame body 29.

At positions below the upper tool holder support members 31L and 31R, the left and right pair of lower tool holder support members 33L and 33R that are long in the front-and-back direction are provided horizontally and integrally with the frame body 29.

Figure 3:
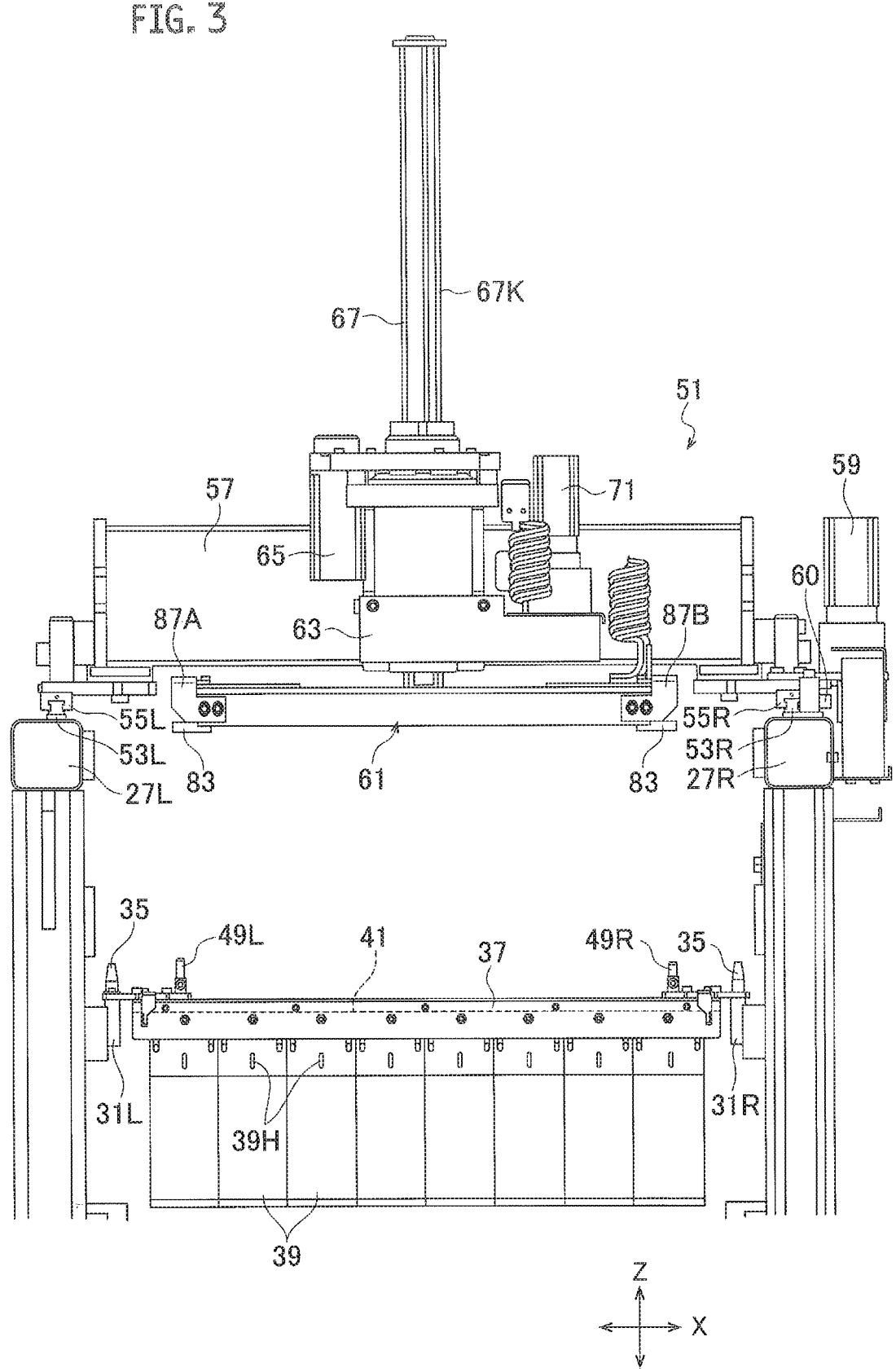
FIG. 3 is an operation explanatory view showing a relationship between an upper tool holder conveying mechanism and an upper tool holder.

On the left and right upper tool holder support members 31L and 31R, a plurality of positioning pins 35 (refer to FIG. 3) are erected, while maintaining a predetermined interval in the front-and-back direction (the direction perpendicular to the paper of FIG. 3). On the respective positioning pins 35, both the left and right end sides of upper tool holders 37 are supported to be engaged therewith.

The upper tool holders 37 hold upper tools 39 such as divided upper tools, for example, so that the upper tools 39 can be subjected to the attaching and detaching replacement. The upper tool holders 37 are also provided with tool mounting grooves 41, which are open to a lower side and are long in the left-and-right direction (X-axis direction) so as to be capable of attaching and detaching the upper tools 39 in the up-and-down direction and the left-and-right direction. Note that each of the upper tools 39 have a configuration including insertion. holes 39H, which freely enable insertion of the tool holding portions (not shown) provided in the tool replacement device 19U, and have the same configuration as that of the divided tools in PTL 2.

Moreover, such a configuration of the tool mounting grooves 41, which support the upper tools 39 in the upper tool holders 37 so as to be capable of attaching and detaching the upper tools 39, are the same as the configuration of the replaced upper tool support members described in PTL 2. Hence, a detailed description of the configuration of the attaching and detaching the upper tools 39 to and from the upper tool holders 37 as well as a detailed description of the upper tools 39 is omitted.

Positioning members 43, which include positioning holes 43H (refer to FIG. 6), through which the positioning pins 35 are insertable in the up-and-down direction, are fixed integrally therewith onto the upper surfaces of both the left and right end sides of each of the upper tool holders 37.

Figure 6:
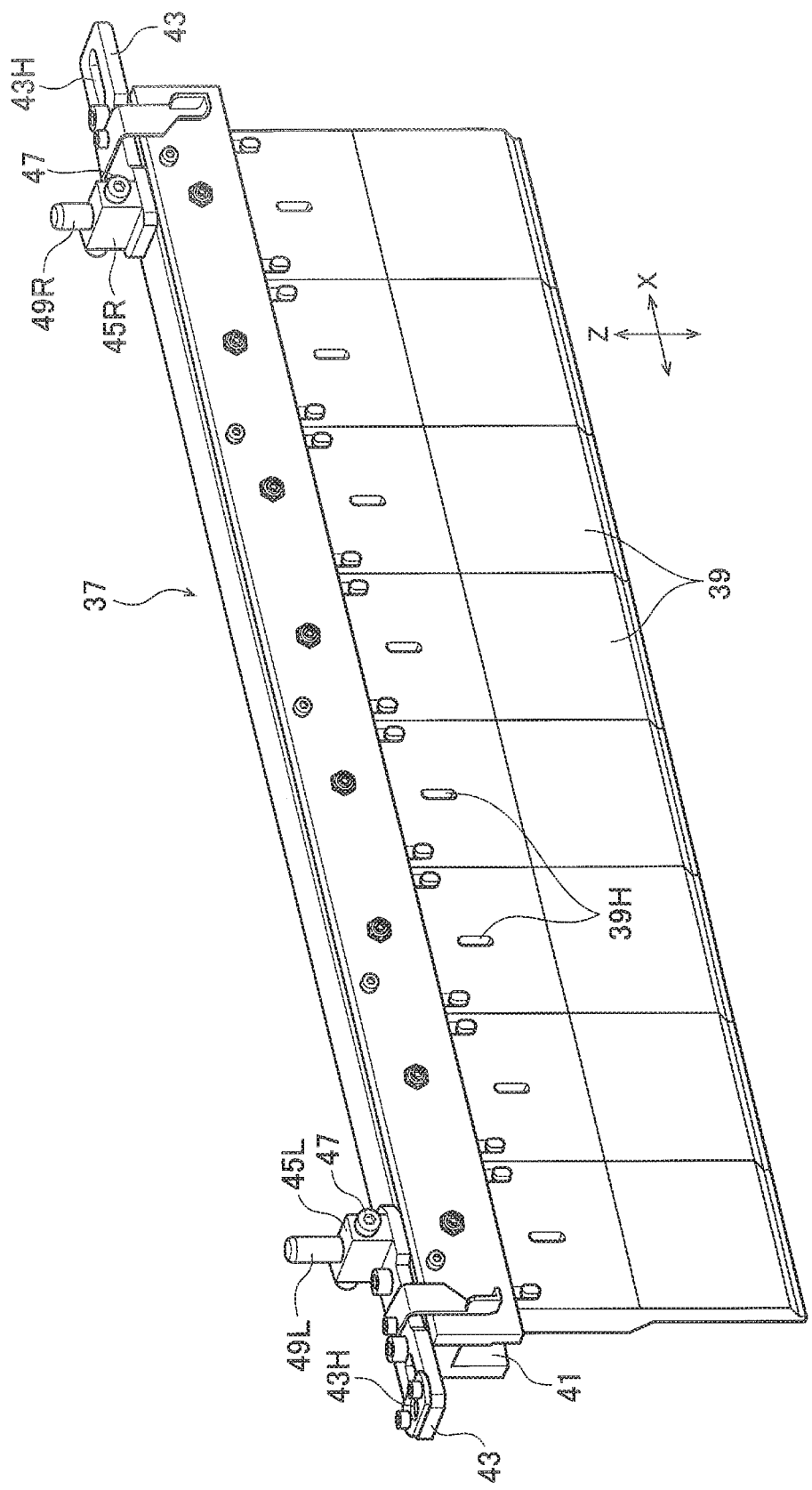
FIG. 6 is a perspective view of the upper tool holder that holds an upper tool.
Figure 7:
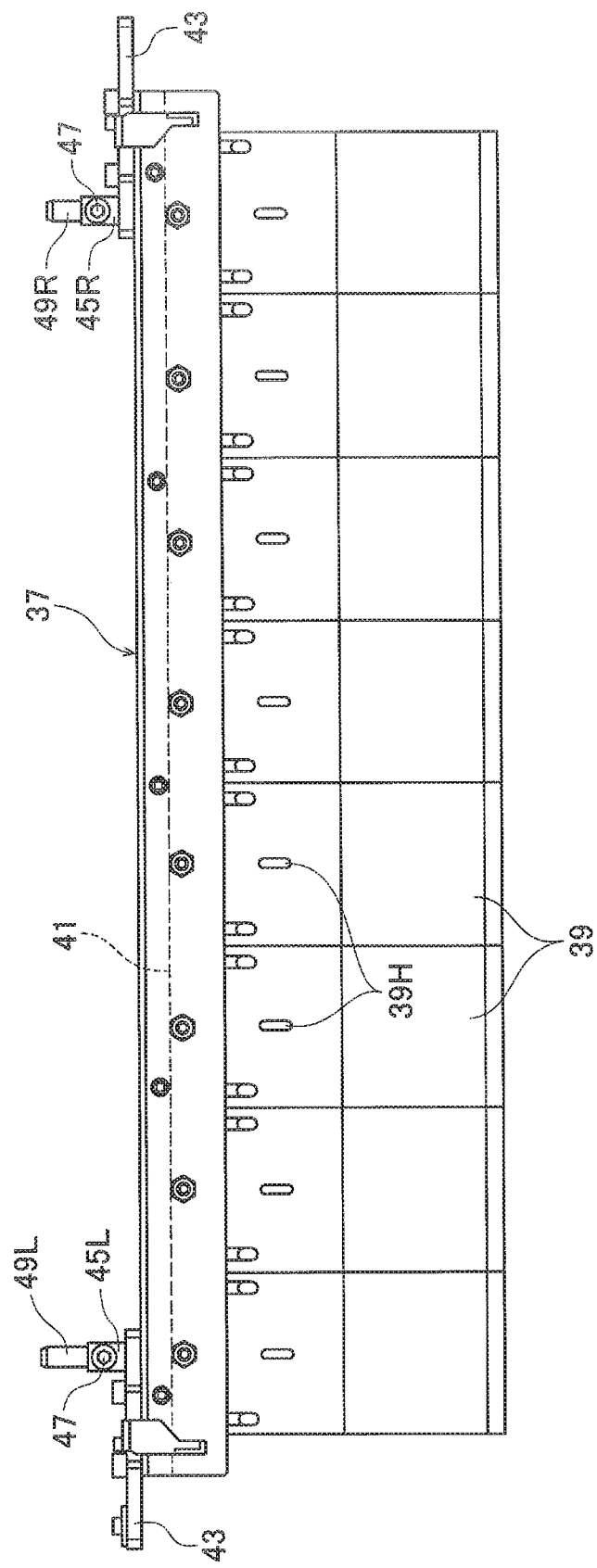
FIG. 7 is a front view of the upper tool holder that holds the upper tool.

In the positioning members 43 on both the left and right end sides, the positioning hole 43H formed in the positioning member 43 on the right side in FIGS. 6 and 7 is formed into a long hole that is long in the left-and-right direction. In the positioning members 43 on both the left and right end sides, the positioning hole 43H formed in the positioning member 43 on the left side is formed into a circular hole (positioning hole) with a diameter slightly larger than the diameter of the positioning pin 35.

Hence, when the positioning holes 43H, which are provided in the left and right positioning members 43 in the upper tool holder 37, and the positioning pins 35 are engaged with each other, with regard to the upper tool holder 37, movement thereof the front-and-back direction and the left-and-right direction is regulated with respect to the left and right upper tool holder support members 31L and 31R, and the upper tool holder 37 is supported in a state of being positioned at an accurate position.

The left and right positioning blocks 45L and 45R are fixed integrally onto the left and right positioning members 43, therewith, respectively. Rollers 47 are provided on both the front and back surfaces of the positioning blocks 45L and 45R.

Moreover, the left and right positioning pins 49L and 49R are erected on center positions in the front-and-back direction on the upper surfaces of the positioning blocks 45L and 45R. The left and right positioning pins 49L and 49R are different from each other in terms of height dimension, also serving as front and back indicators to be described later, and in addition, as centering functions for allowing a center position in the front-and-back direction of an upper tool holder conveying mechanism to coincide with a center position in the front-and-back direction of the upper tool holder 37 in a case of conveying the upper tool holder 37 by an upper tool holder conveying mechanism to be described later.

In order to lift such a desired upper tool holder 37 in which both the left and right end sides are supported by the left and right upper tool holder support members 31L and 31R, and to convey the upper tool holder 37 to a position of the guide rail extended portion 21U provided on the upper table 15, an upper tool holder conveying mechanism 51

(refer to FIG. 3) is provided on an upper portion of the frame body 29, so as to be movable in the front-and-back direction.

More specifically, on the upper surfaces of the guide members 27L and 27R, guide rails 53L and 53R extended in the front-and-back direction are provided, and left and right sliders 55L and 55R are supported on the guide rails 53L and 53R so as to be movable. Both end sides of a beam member 57 that is long in the left-and-right directions are fixed integrally therewith onto the left and right sliders 55L and 55R.

The servo motor 59, for moving and positioning the upper tool holder conveying mechanism 51 in the front-and-back direction, is mounted onto the slider 55R as one in the pair, and a pinion (not shown), rotated by the servo motor 59, meshes with a rack 60, which is provided on the guide member 27R, and is extended in the front-and-back direction.

Hence, a rotation of the servo motor 59 is controlled by a control device (not shown), whereby the upper tool holder conveying mechanism 51 can be moved and positioned in the front-and-back direction.

The upper tool holder holding member 61 that is capable of holding the upper tool holder 37 is provided on a center portion in the left-and-right direction of the beam member 57, so as to be movable in the up-and-down direction. That is, a motor bracket 63 is provided on the center portion of the beam member 57, and onto the motor bracket 63 there is mounted a servo motor 65 for rotating a ball nut (not shown) in a ball screw mechanism (not shown).

A ball screw 67 penetrates and meshes with the ball nut, which is provided in the motor bracket 63 so as to be rotatable, so as to be movable in the up-and-down direction. A lower end portion of the ball screw 67 is integrally coupled to a center portion in the left-and-right direction of the upper tool holder holding member 61. In order to regulate a rotation of the ball screw 67, a key groove 67K extended in the up-and-down direction is formed on the ball screw 67.

A pulley 69 (refer to FIG. 8), which is provided under the motor bracket 63 so as to be movable, penetrates the ball screw 67 so as to be movable in the up-and-down direction, and a key (not shown), which is provided to protrude on an inner circumferential surface of the pulley 69, engages with the key groove 67K so as to be relatively movable in the up-and-down direction. The pulley 69 is linked and coupled to a servo motor 71 mounted on the motor bracket 63.

By the above-described configuration, when the servo motor 71 is stopped and the rotation of the ball screw 67 is regulated, the servo motor 65 is driven to rotate the ball nut, whereby the upper tool holder holding member 61 is moved in the up-and-down direction. Moreover, the ball screw 67 can be rotationally moved horizontally about an axial center thereof by driving the servo motor 71, and the front and back of the upper tool holder holding member 61 can be inverted.

That is, the rotations of the servo motors 65 and 71 are controlled as is appropriate, whereby the upper tool holder holding member 61 can be moved in the up-and-down direction, the upper tool holder holding member 61 can be turned horizontally, and the front and back thereof can be inverted. The servo motor 71 functions as a turning mechanism that turns the upper tool holder holding member 61 horizontally.

In order to hold the upper tool holder 37 by the upper tool holder holding member 61, the upper tool holder holding member 61 is configured as follows.

Figure 8:
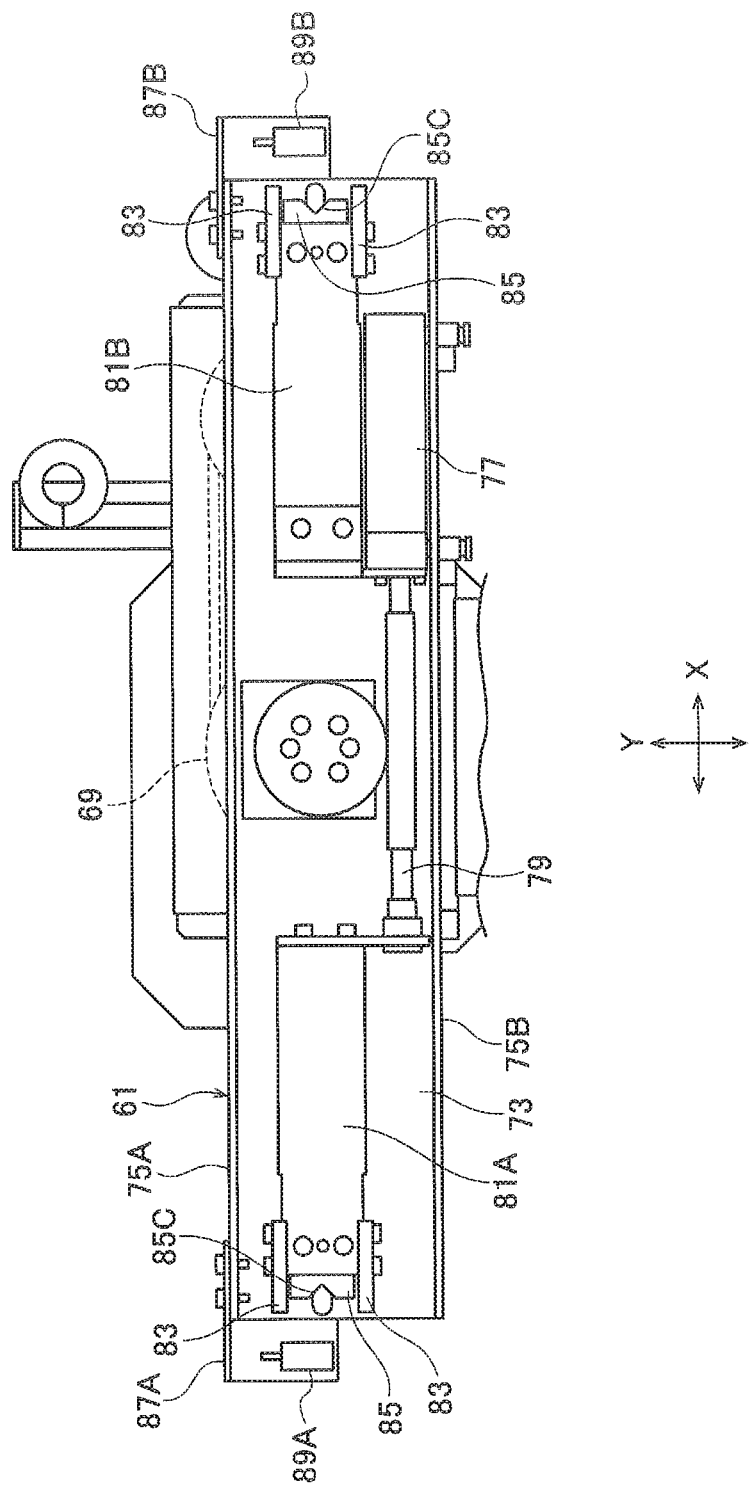
FIG. 8 is a bottom view showing a configuration of an upper tool holder holding member.
Figure 9:
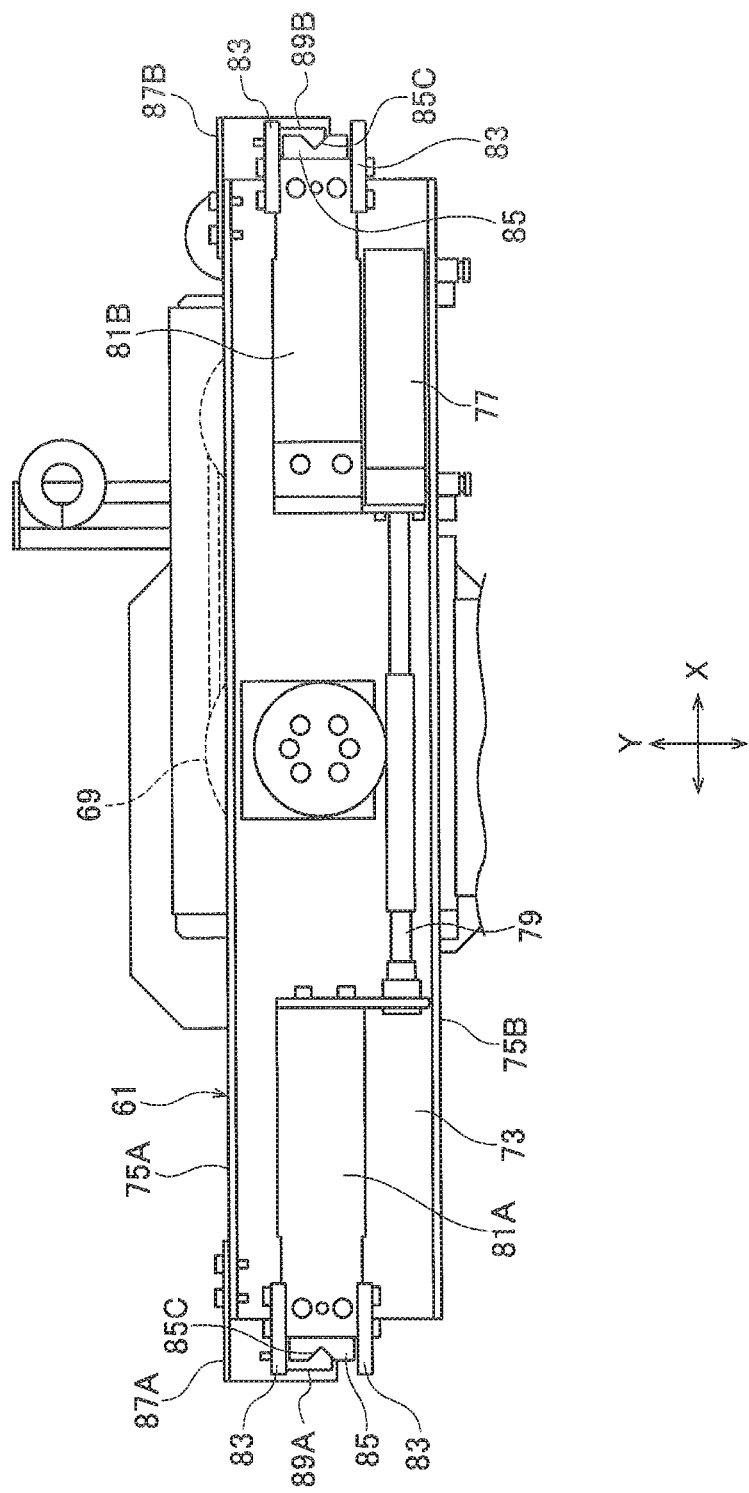
FIG. 9 is a bottom view showing the configuration of the upper tool holder holding member.
Figure 10:
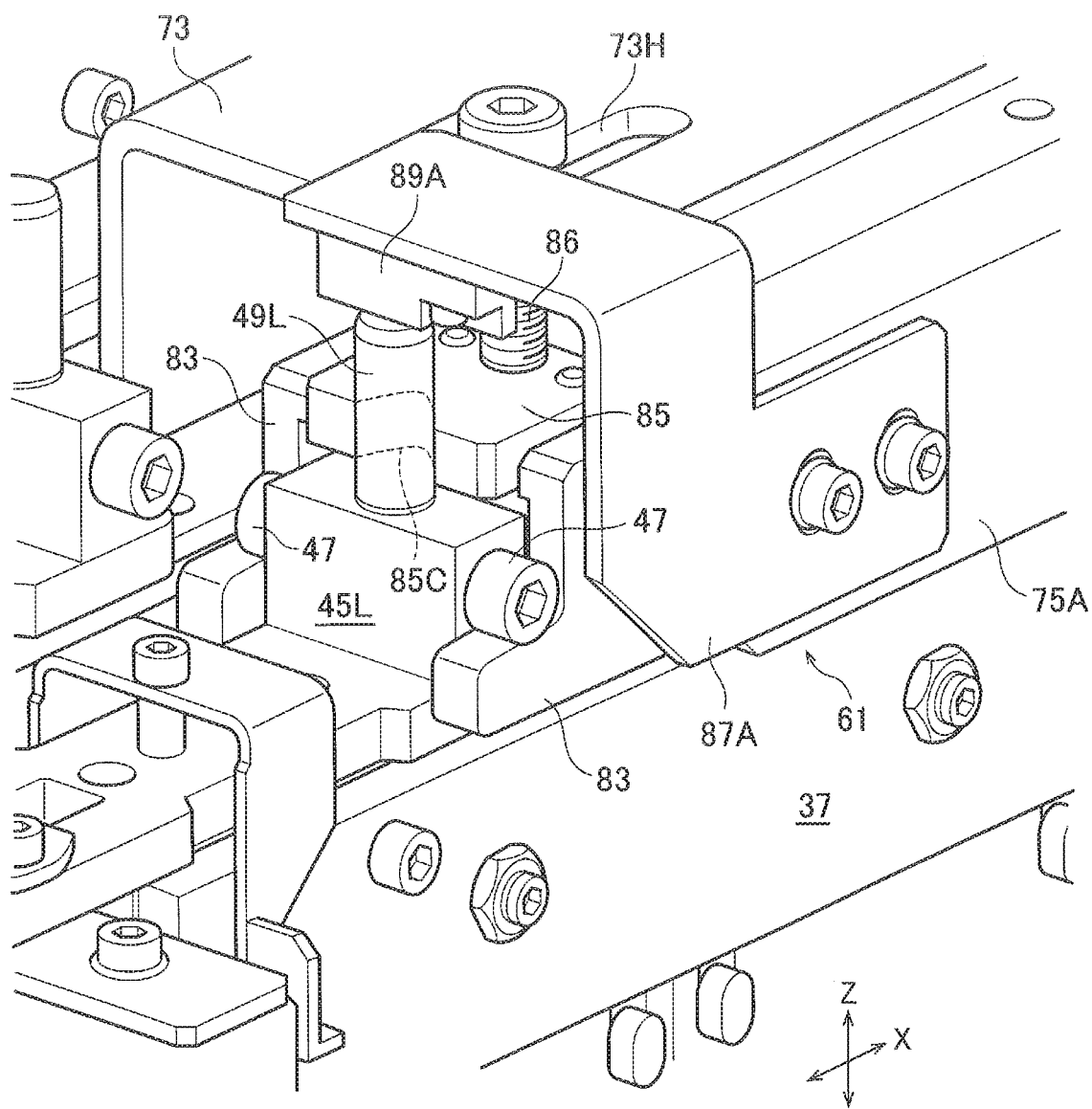
FIG. 10 is a perspective view showing a centering mechanism on a left side of the upper tool holder.

As shown by the bottom views in FIGS. 8 and 9, on both the front and back sides of a top plate which is long in the left-and-right direction and is provided in the upper tool holder holding member 61, side plates 75A and 75B long in the left-and-right direction are attached perpendicularly thereto and integrally therewith. On an inner side surface of the side plate 75B as one in such a pair, a reciprocating actuator 77, for example, such as a fluid pressure cylinder, is provided so as to be movable in the left-and-right direction.

To a reciprocating rod 79 such as a piston rod provided in the reciprocating actuator 77 so as to be capable of reciprocating, a slide plate 81A is coupled integrally therewith, which is supported on one end side of a lower surface of the top plate 73 so as to be movable in a longitudinal direction (left-and-right direction in FIGS. 8 and 9). On the reciprocating actuator 77, a slide plate 81B is provided integrally therewith, which is provided on the other end side of the lower surface of the top plate 73 so as to be movable in the longitudinal direction.

On tip end sides of the slide plates 81A and 81B, a pair of roller engagement brackets 83 (refer to FIGS. 8 to 11) are provided, which are capable of entering lower sides of the rollers 47 provided on both end sides of the upper tool holder 37.

On such tip ends of the slide plates 81A and 81B, centering blocks 85 are provided integrally therewith, which include V-shaped engagement recessed portions 85C capable of engaging with the positioning pins 49L and 49R, provided on both end sides of the upper tool holder 37.

Guide pins 86 (refer to FIG. 10) erected on the centering blocks 85 are inserted through guide holes 73H, which are extended in the longitudinal direction and are provided in the top plate 73, so as to be movable, whereby the centering blocks 85 are guided in the left-and-right direction.

Moreover, sensor brackets 87A and 87B are attached onto both end portions of the side plate 75A. In the sensor brackets 87A and 87B, sensors 89A and 89B, such as proximity sensors which detect the positioning pins 49L and 49R, are provided. The positioning pins 49L and 49R are differentiated from each other by height dimensions, and thereby also serve as the front and back indicators. The sensors 89A and 89B also serve as front and back detection mechanisms which detect the positioning pins (front and back indicators) 49L and 49R.

That is, such protrusion height dimensions of the positioning pins 49L and 49R are different from each other, whereby, for example, when the sensor 89A as one in the pair detects the high positioning pin 49L, the low positioning pin 49R corresponds to the sensor 89B, as the other in the pair, and the positioning pin 49R cannot be detected.

Hence, for example, when the sensor 89A as one in the pair detects the positioning pin 49L when the upper tool holder holding member 61 is lowered from a rising position to hold the upper tool holder 37, the sensor 89A can detect that the upper tool holder 37 faces forward. When the sensor 89B, as the other in the pair, detects the positioning pin 49L when the upper tool holder holding member 61 holds the upper tool holder 37, the sensor 89B can detect that the upper tool holder 37 faces backward.

Figure 4:
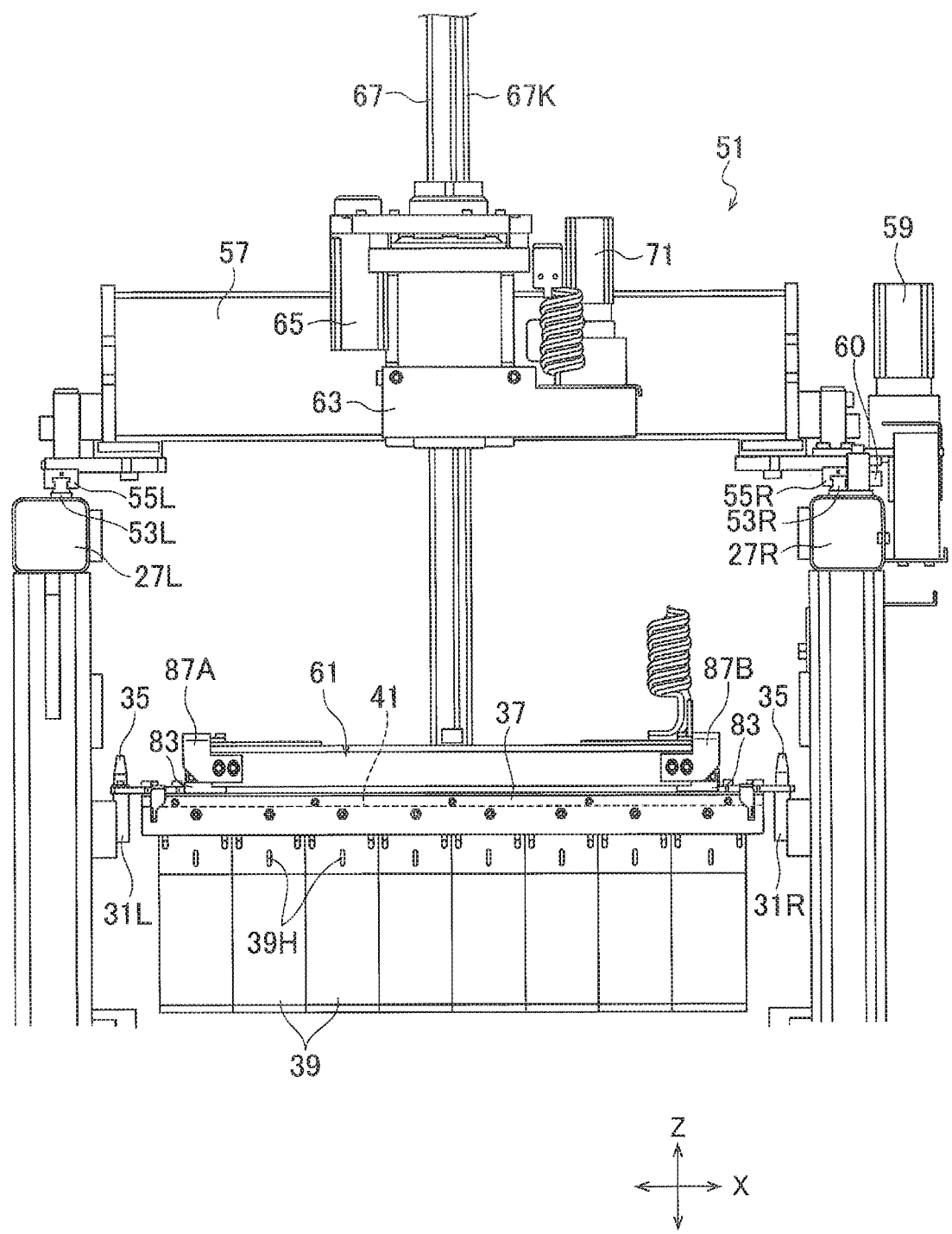
FIG. 4 is an operation explanatory view showing relationship between the upper tool holder conveying mechanism and the upper tool holder.

In order to hold the desired upper tool holder 37, which is supported by the upper tool holder support members 31L and 31R, and by the upper tool holder holding member 61, the beam member 57 is moved in the front-and-back direction, and the upper tool holder holding member 61 is positioned to an upper position of the desired upper tool holder 37 (refer to FIG. 3). Thereafter, when the upper tool holder holding member 61 is lowered, the upper tool holder holding member 61 overlaps the upper tool holder 37, and the mode in which the slide plates 81A and 81B get on the upper tool holder 37 is formed (refer to FIG. 4).

When the reciprocating rod 79 is actuated to protrude from the reciprocating actuator 77 when the slide plates 81A and 81B of the upper tool holder holding member 61 are in a state of getting on the upper tool holder 37, then, for example, the slide plate 81A moves, as one in the pair, and the roller engagement bracket 83, provided on the slide plate 81A, enters the lower side of the roller 47 provided on the positioning block 45L. Simultaneously, the engagement recessed portion 85C formed on the centering block 85 engages with the positioning pin 49L as one in the pair, which is provided on the upper tool holder 37, and the upper tool holder 37 is centered with respect to the upper tool holder holding member 61 (refer to FIG. 10).

In this case, the sensor 89A provided on one end side of the upper tool holder holding member 61 faces to the positioning pin 49L as one in the pair, and detects the positioning pin 49L as one in the pair.

Figure 11:
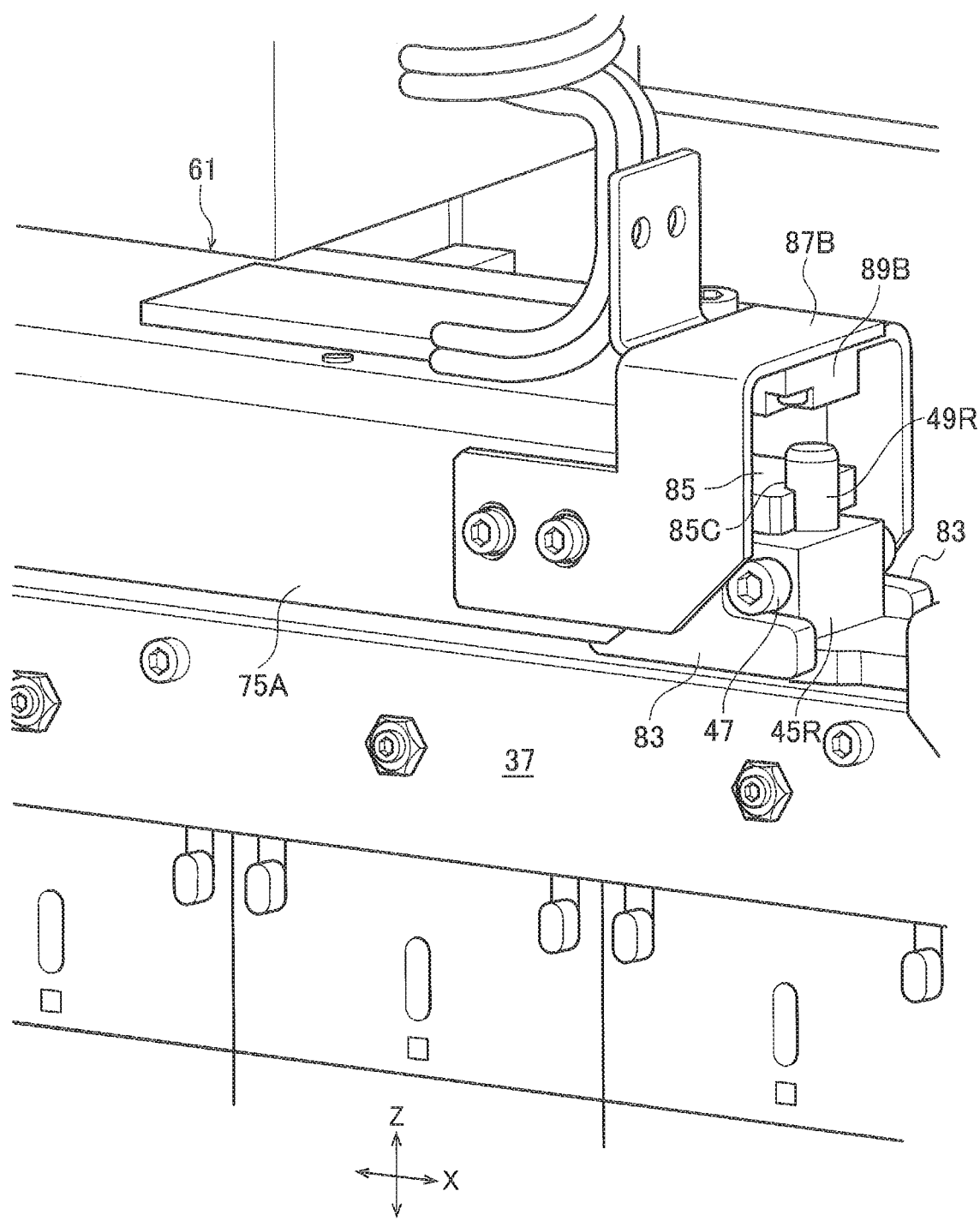
FIG. 11 is a perspective view showing a centering mechanism on a right side of the upper tool holder.

Then, when the engagement recessed portion 85C of the centering block 85 provided on the slide plate 81A as one in the pair engages with the positioning pin 49L as one in the pair, then the slide plate 81B as the other in the pair moves in an opposite direction, and the roller engagement bracket 83 provided on the slide plate 81B enters the lower side of the roller 47 provided on the slide plate 81B (refer to FIG. 11).

Moreover, the engagement recessed portion 85C, formed on the centering block 85 provided in the slide plate 81B, engages with the positioning pin 49R, and the upper tool holder 37 is centered with respect to the upper tool holder holding member 61. The sensor 89B provided on the other end side corresponds to the positioning pin 49R. In this case, the positioning pin 49R is shorter than the positioning pin 49L as one in the pair, and accordingly, is not detected by the sensor 49B.

As is already understood, when the upper tool holder 37 is held by the upper tool holder holding member 61, the upper tool holder 37 is centered by the centering mechanism as mentioned above, and accordingly, the center positions in a longitudinal direction of the upper tool holder holding member 61 and in a longitudinal direction and front-and-back direction of the upper tool holder 37 turn to a state of coinciding with each other. The sensor 89A or the sensor 89B detects the positioning pin 49L, and can thereby detect whether the upper tool holder 37 faces forward or backward.

Note that, as a configuration of detecting the front and back of the upper tool holder 37, it is also possible to adopt a configuration in which a sensing target member, for example, such as a magnet, is appropriately provided on one end side of the upper tool holder 37, and a sensor that detects such a sensing target is provided on the upper tool holder holding member 61.

Figure 5:
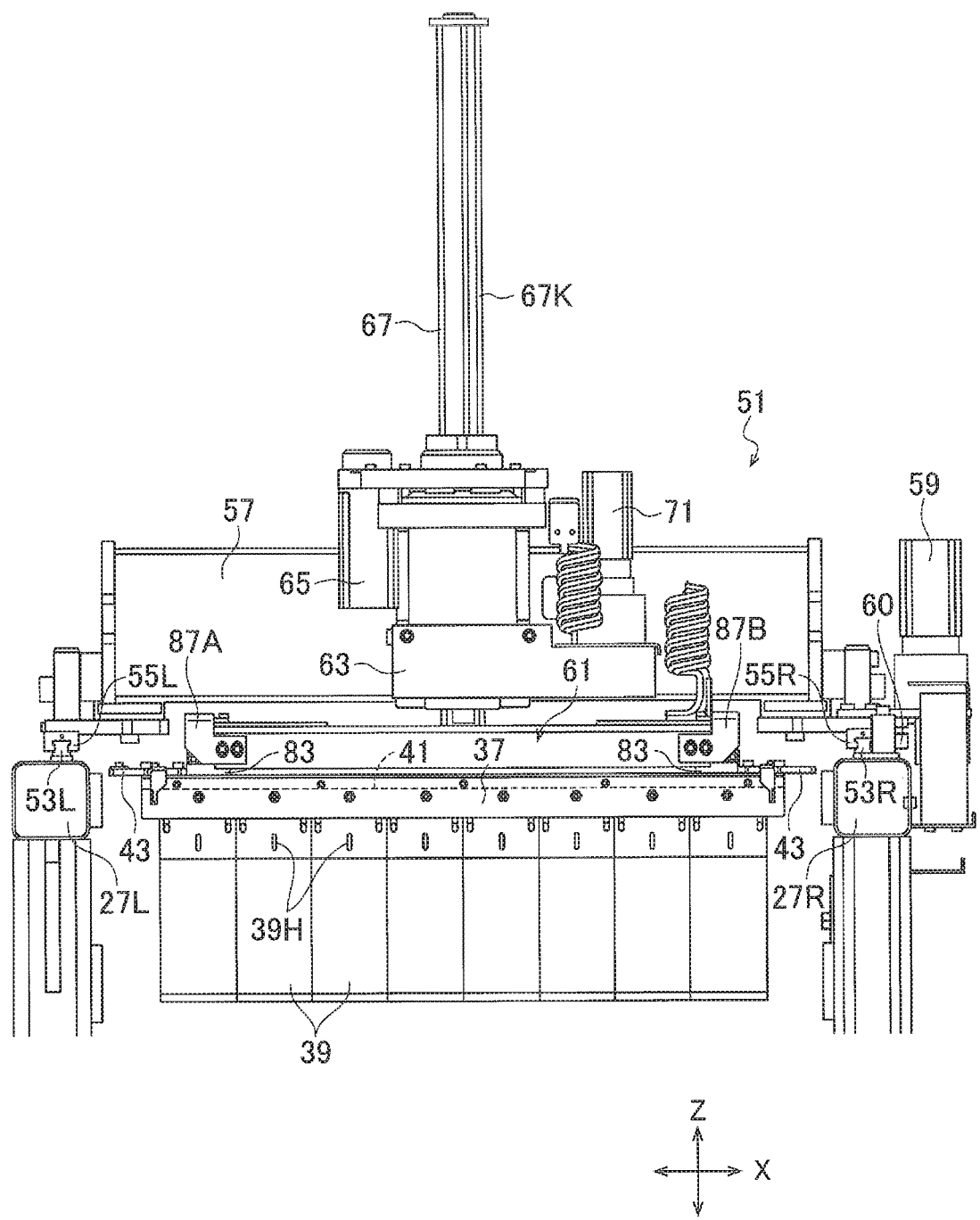
FIG. 5 is an operation explanatory view showing a relationship between the upper tool holder conveying mechanism and the upper tool holder.

Then, when the front and back of the upper tool holder 37 are inverted, the servo motor 71 is driven to turn the upper tool holder holding member 61 horizontally when the upper tool holder 37 is lifted up from the upper tool holder support members 31L and 31R and is conveyed to the position of the guide rail extended portion 21U (refer to FIG. 5). In this way, the front and back of the upper tool holder 37 can be inverted.

Figure 12A:
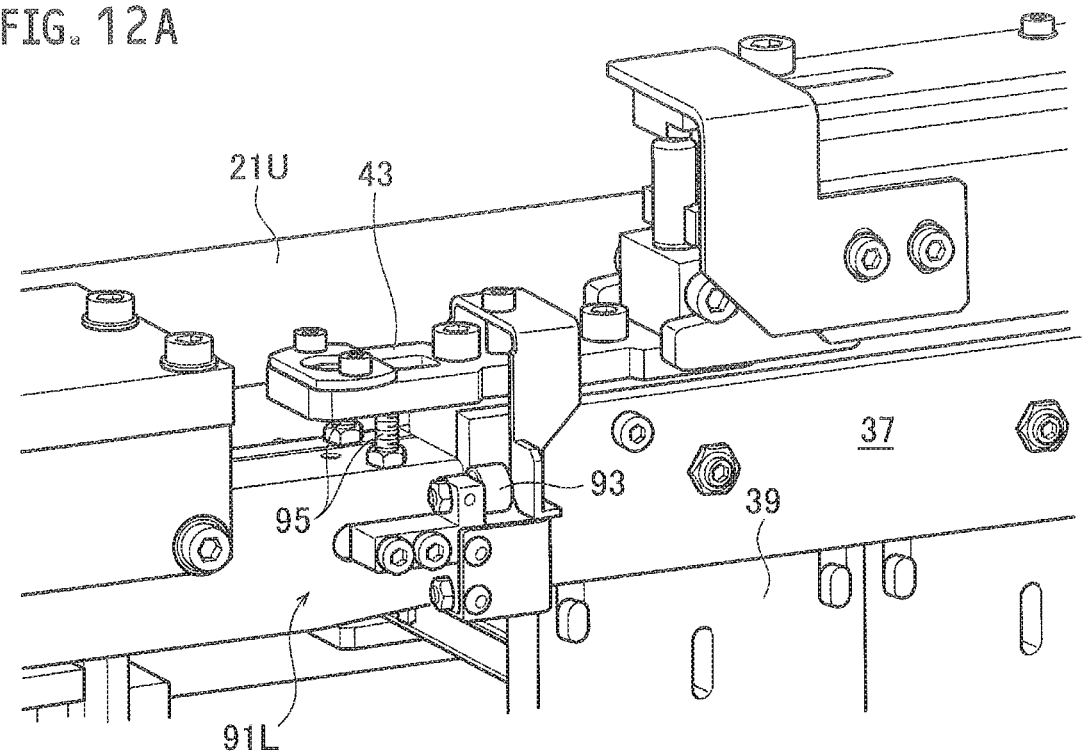
FIG. 12A is a perspective view showing a configuration of supporting a left end side of the upper tool holder in a guide rail extended portion.
Figure 12B:
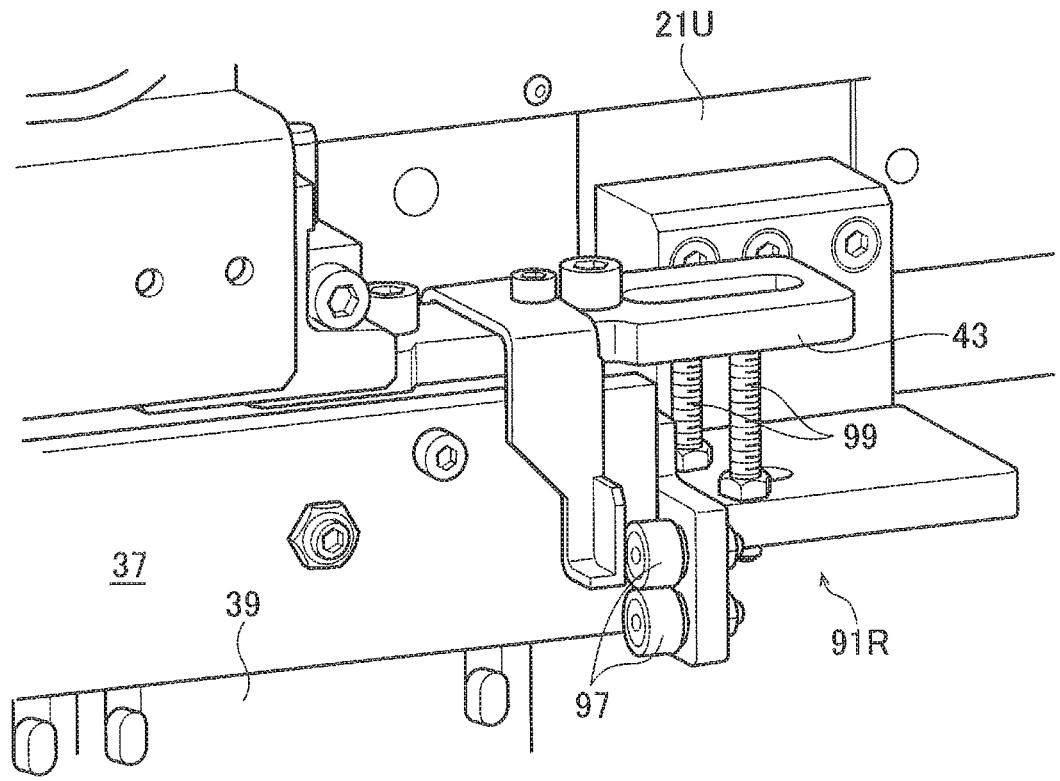
FIG. 12B is a perspective view showing a configuration of supporting a right end side of the upper tool holder in the guide rail extended portion.

The upper tool holder 37, conveyed to the position of the guide rail extended portion 21U, is supported on end support portions 91L and 91R provided on a front side of the guide rail extended portion 21U (refer to FIGS. 12A and 12B). That is, on the front side of the guide rail extended portion 21U, there are provided: the end support portion 91L (refer to FIG. 12A) that supports the positioning member 43 which is one in the pair and is provided on the upper tool holder 37 (refer to FIG. 12A); and the end support portion 91R (refer to FIG. 12B) that supports the positioning member 43 which is the other in the pair and is provided on the upper tool holder 37 (refer to FIG. 12B).

On the end support portion 91L as one in the pair, as shown in FIG. 12A, there is provided a guide roller 93 which sandwiches one end side of the upper tool holder 37 in the front-and-back direction. Moreover, on the end support portion 91L, there are provided a plurality of support pins (support members) 95 which support, from the lower side, the positioning member 43, which is one in the pair and is provided on one end side of the upper tool holder 37.

On the end support portion 91R as the other in the pair, as shown in FIG. 12B, there is provided a guide roller 97 which sandwiches the other end side of the upper tool holder 37 in the front-and-back direction. Moreover, on the end support portion 91R as the other in the pair, there are provided a plurality of support pins 99 (support members) which support the positioning member 43 which is the other in the pair, and is provided on the other end side of the upper tool holder 37.

When both end sides of the upper tool holder 37 are supported by the end support portions 91L and 91R, the upper tool holder 37 is arranged in line with the upper tool mounting portion 17 in the left-and-right direction, the upper tool mounting portion 17 being provided on the upper table 15 in the press brake 3. Hence, by the tool replacement device 19U provided so as to be movable in the left-and-right direction, it is possible to easily perform the attaching and detaching replacement of the upper tools 39 between the upper tool holder 37 and the upper tool mounting portion 17.

As mentioned above, when an operation of drawing the reciprocating rod 79 into the reciprocating actuator 77 is performed, which is provided on the upper tool holder holding member 61, after both left and right end sides of the upper tool holder 37 are supported on the left and right end support portions 91L provided on the front side of the guide rail extended portion 21U, then the slide plates 81A and 81B move in directions of approaching each other, and the roller engagement brackets 83 leave the rollers 47. Hence, the upper tool holder holding member 61 can be lifted up and returned to an initial position thereof.

That is, another upper tool holder 37 supported on the upper tool holder support members 31L and 31R can be newly held by the upper tool holder holding member 61. Hence, the other upper tool holder 37 can be conveyed to and supported on an upper tool attaching and detaching station 101U (refer to FIG. 2) disposed on a back side of the upper tool holder support members 31L and 31R. Therefore, the attaching and detaching replacement of the upper tools 39 can be manually performed from the back side to the other upper tool holder 37, conveyed to and supported on the upper tool attaching and detaching station 101U.

That is, even during the folding of the workpiece in the press brake 3, it is possible to easily perform the attaching and detaching replacement of the upper tools 39 to the upper tool holder 37. Hence, at the time of the attaching and detaching replacement of the tool to the press brake 3, the attaching and detaching replacement of the upper tools 39 is performed to the upper tool holder 37 during the folding of the workpiece by the press brake 3, whereby efficiency of a tooling operation can be enhanced.

As shown in FIG. 2, on the lower tool holder support members 33L and 33R provided below the upper tool holder support members 31L and 31R in the tool storage device 1, a plurality of lower tool holders 105 (refer to FIG. 13), each of which holds lower tools 103 folding a plate-like workpiece in cooperation with the upper tools 39, are supported in parallel with one another in the front-and-back direction.

Note that the configuration of the lower tools 103 is the same as the configuration of the lower tools described in PTL 2, and moreover, the configuration in which the lower tool holder 105 holds the lower tools 103 is the same as the configuration described in PTL 2, and is an already known configuration. Hence, detailed descriptions of the lower tools 103 and the lower tool holder 105 holding the lower tools 103 are omitted.

Figure 13:
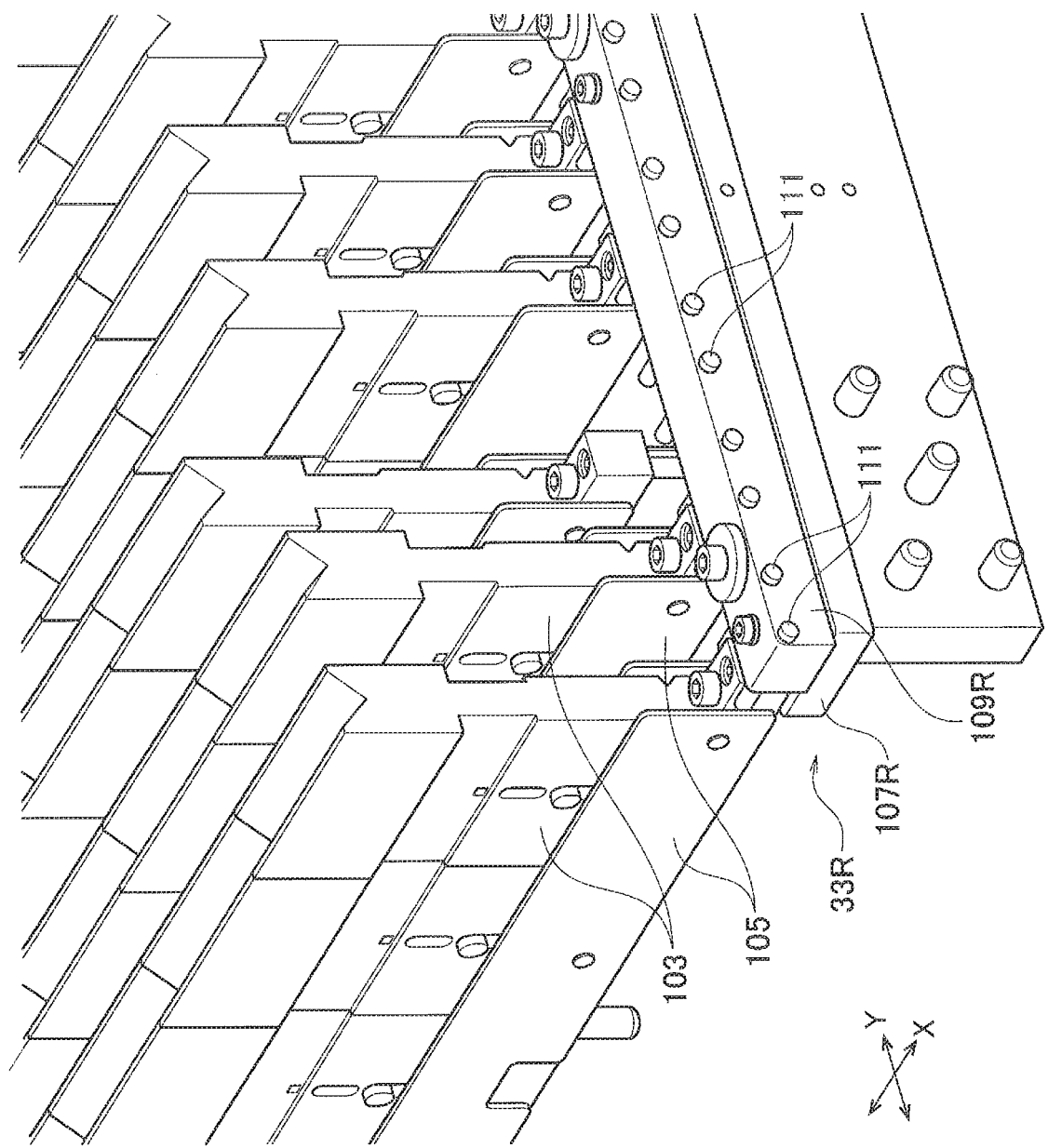
FIG. 13 is a perspective view showing a configuration of a lower tool holder support member.
Figure 14:
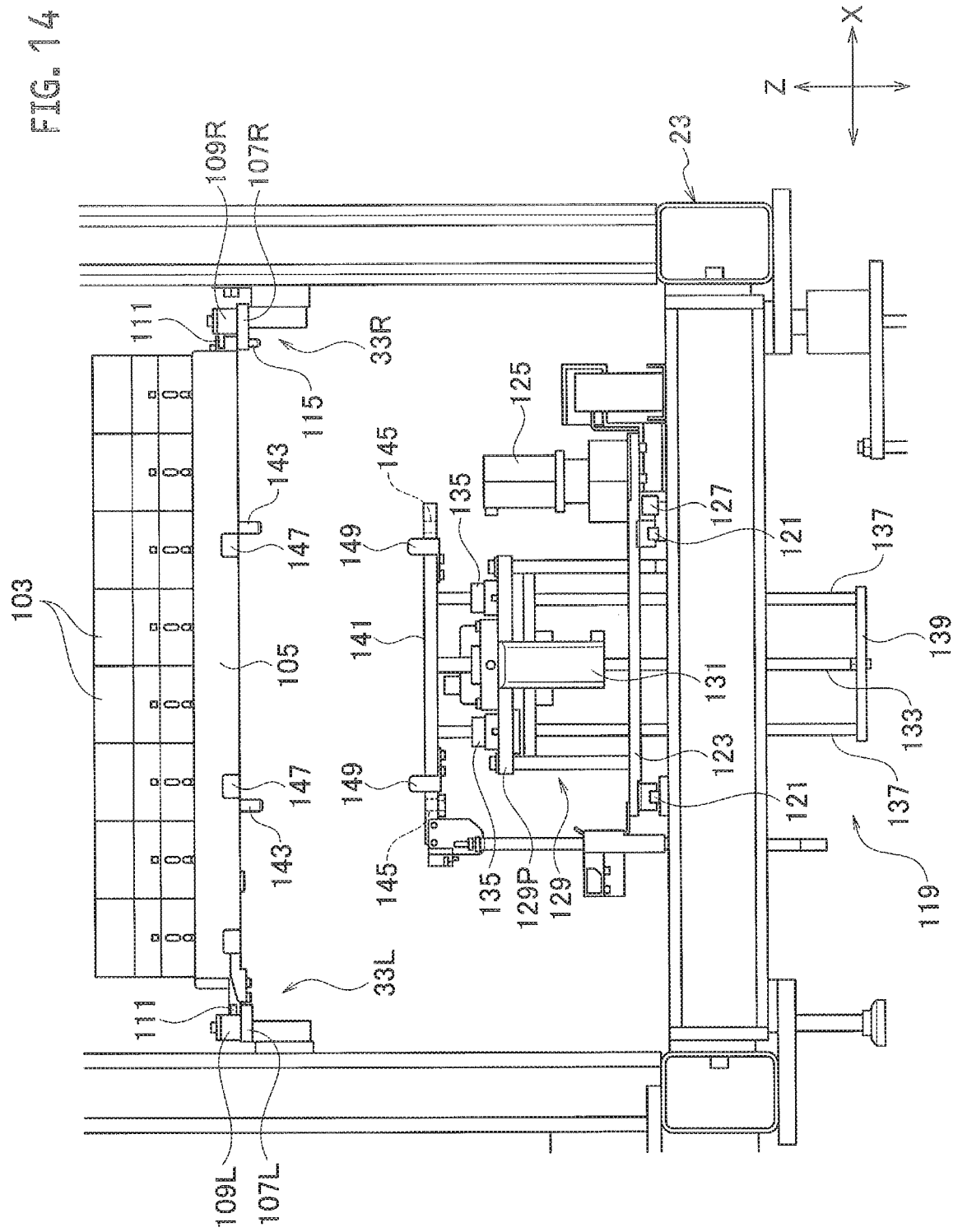
FIG. 14 is a front view showing operations of conveying the lower tool holder by a lower tool holder conveying mechanism (an upper tool holder conveying means).

As shown in FIGS. 13 and 14, the left and right lower tool holder support members 33L and 33R have a configuration in which holder bars 109L and 109R that are long in the front-and-back direction are provided integrally on support plates 107L and 107R that are long in the front-and-back direction. Step difference portions which support both the left and right end sides of the lower tool holders 105 are formed between the support plates 107L and 107R, and the holder bars 109L and 109R.

More specifically, as shown in FIG. 14, opposed inner portions of the left and right support plates 107L and 107R protrude to the inside more than the inner surfaces of the holder bars 109L and 109R, so that the opposed inner portions support the left and right end sides of each of the lower tool holders 105 on the upper surfaces of the opposed inner portions. In order to regulate the movement of each of the lower tool holders 105 in the front-and-back direction, a front and back pair of regulating pins 111 are provided in the left and right holder bars 109L and 109R so as to protrude horizontally inward. Plural pairs of the regulating pins 111 are provided at a predetermined interval in the front-and-back direction.

Hence, both left and right end sides of the lower tool holder 105 supported on the support plates 107L and 107R are located between the front and back pair of regulating pins 111.

A region between the pair of regulating pins 111 composes an end portion holding region for holding the end portion side of the lower tool holder 105. A plurality of the end portion holding regions are provided at an appropriate interval in the front-and-back direction, and between the respective end portion holding regions, passage regions are composed, through which both the left and right end sides of the lower tool holders 105 are passable in the up-and-down direction. That is, the end portion holding regions and the passage regions are provided alternately with each other in the front-and-back direction.

Portions in which the support plates 107L and 107R support both the left and right end sides of each of the lower tool holders 105 protrude inward so as to correspond to the end portion holding region between the pair of regulating pins 111. In each of inward-protruding portions (support portions) 113 (refer to FIG. 16) on the right support plate 107R, a positioning hole 113H is provided with which a positioning pin 115 provided on a right end portion of the lower tool holder 105 so as to protrude downward is capable of engaging.

Hence, the right end side of the lower tool holder 105 is positioned in such a way that the positioning pin 115 is engaged with the positioning hole 113H, and front and back movement of the right end side concerned is regulated by the pair of regulating pins 111.

Note that, as long as such a function to position the left end side of the lower tool holder 105 is provided, the configuration of supporting the left end side of the lower tool holder 105 by the left support plate 107L may be the same configuration as the configuration of supporting the right end side of the lower tool holder 105, or may be a desired configuration different therefrom, and accordingly, a detailed description of the configuration of supporting the left end side of the lower tool holder 105 is omitted.

On the portions in which the left and right support plates 107L and 107R support both left and right end sides of each of the lower tool holder 105, the protruding portions 113 are provided so as to correspond to the end portion holding regions each between the pair of regulating pins 111. On the positions corresponding to the passage regions, recessed portions 117 (refer to FIG. 16) are formed so that the lower tool holders 105 can freely pass up and down therethrough. That is, the opposite surfaces (inside surfaces) of the left and right support plates 107L and 107R are formed into a comb tooth shape in which the protruding portions 113 and the recessed portions 117 are provided alternately with each other in the front-and-back direction.

Hence, each of the lower tool holders 105, in which both left and right end sides are supported by the left and right support plates 107L and 107R, is lifted up above the pair of regulating pins 111, thereafter moves forward or backward, and is positioned to the position corresponding to the passage region. In this way, the lower tool holder 105 can be lowered below the support plates 107L and 107R.

In order to convey the lower tool holder 105, which is supported on the lower tool holder support members 33L and 33R to the position of the guide rail extended portion 21L, a lower tool holder conveying mechanism 119 (refer to FIG. 14) is provided so as to be movable in the front-and-back direction. That is, as shown in FIG. 14, on the center portion in the left-and-right direction of the base frame 23, there are provided guide rails 121 that are long in the front-and-back direction (the direction perpendicular to the paper of FIG. 14).

On the guide rails 121, a slide base 123 is supported so as to be movable forward and backward. In order to move and position of the slide base 123 in the front-and-back direction, a servo motor 125 is mounted on the slide base 123. A pinion (not shown), that is rotationally-driven by the servo motor 125, meshes with a rack 127, which is extended in the front-and-back direction and is parallel to the guide rails 121.

Hence, the servo motor 125 is rotationally-driven under the control of the control device, whereby the slide base 123 can be moved and positioned in the front-and-back direction.

A motor frame 129 is provided on the slide base 123, and on a horizontal top plate 129P provided on an upper portion of the motor frame 129, a ball nut (not shown), rotated by the servo motor 131, is provided so as to be rotatable. A ball screw 133 is screwed into (penetrates) the ball nut so as to be movable in the up-and-down direction.

Moreover, a plurality of guide bushes 135 are provided on the top plate 129P, and in the guide bushes 135, guide bars 137 are guided and supported so as to be movable in the up-and-down direction. Lower end portions of the ball screw 133 and the respective guide bars 137 are integrally-coupled to one another by a coupling member 139.

On the upper end portions of the ball screw 133 and the respective guide bars 137, a lower tool holder holding member 141, which is freely capable of lifting up the lower tool holder 105 from the lower side, is provided integrally therewith. As shown in FIG. 14, the lower tool holder holding member 141 is configured so as to be long in the left-and-right direction, and on both the left and right end sides of the lower tool holder holding member 141, there are formed insertion holes 145, into or through which engagement pins 143 provided on a lower portion of the lower tool holder 105 so as to protrude downward can be fitted (or inserted).

Moreover, on both the left and right end sides of the lower tool holder holding member 141, there are provided front and back holding hook members 149 that are freely capable of engaging with the engagement recessed portions formed on both the front and back surfaces of the lower tool holder 105.

By the above-described configuration, the servo motor 125 is rotationally-driven, and the slide base 123 can be moved and positioned in the front-and-back direction, whereby the lower tool holder holding member 141 in the lower tool holder conveying mechanism 119 can be positioned below such a desired lower tool holder 105, supported on the lower tool holder support members 33L and 33R.

Figure 15:
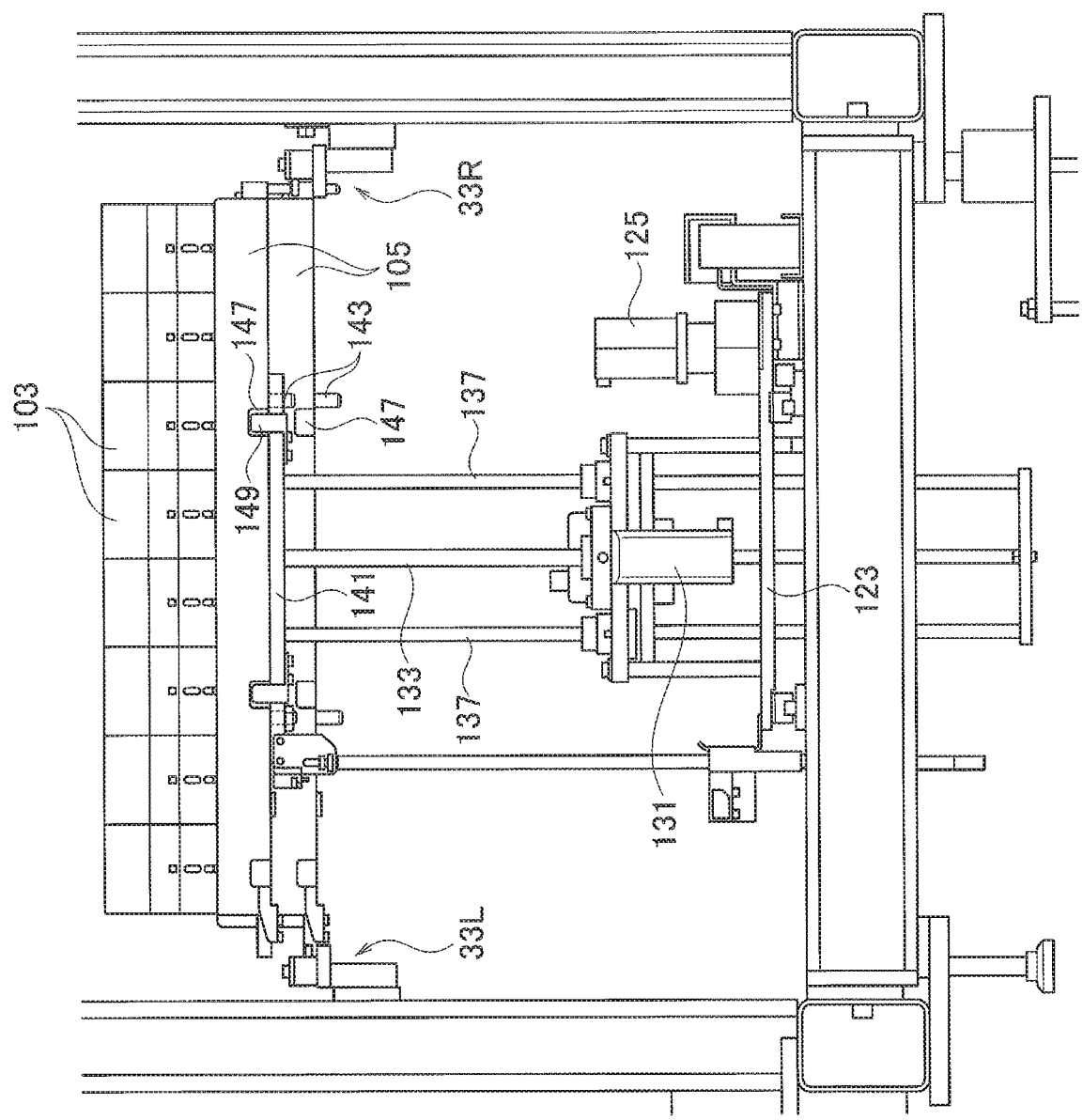
FIG. 15 is a front view showing operations of conveying the lower tool holder by the lower tool holder conveying mechanism (a lower tool holder conveying means).

As mentioned above, after the lower tool holder conveying mechanism 119 is moved and positioned in the front-and-back direction, the servo motor 131 is rotationally-driven, whereby the lower tool holder holding member 141 can be raised (refer to FIG. 15)

When the lower tool holder holding member 141 rises, the lower tool holder 105 is supported from the lower side by the lower tool holder holding member 141. The front and back holding hook members 149 provided in the lower tool holder holding member 141 engage with engagement recessed portions 147, provided on both front and back surfaces of the lower tool holder 105.

Moreover, the engagement pins 143 provided on a lower surface of the lower tool holder 105 are inserted through the insertion holes 145 provided in the lower tool holder holding member 141. Thereafter, when the lower tool holder holding member 141 further rises, then, as shown in FIGS. 15 and 16, both the left and right end sides of the lower tool holder 105 are lifted from the lower tool holder support members 33L and 33R.

Figure 16:
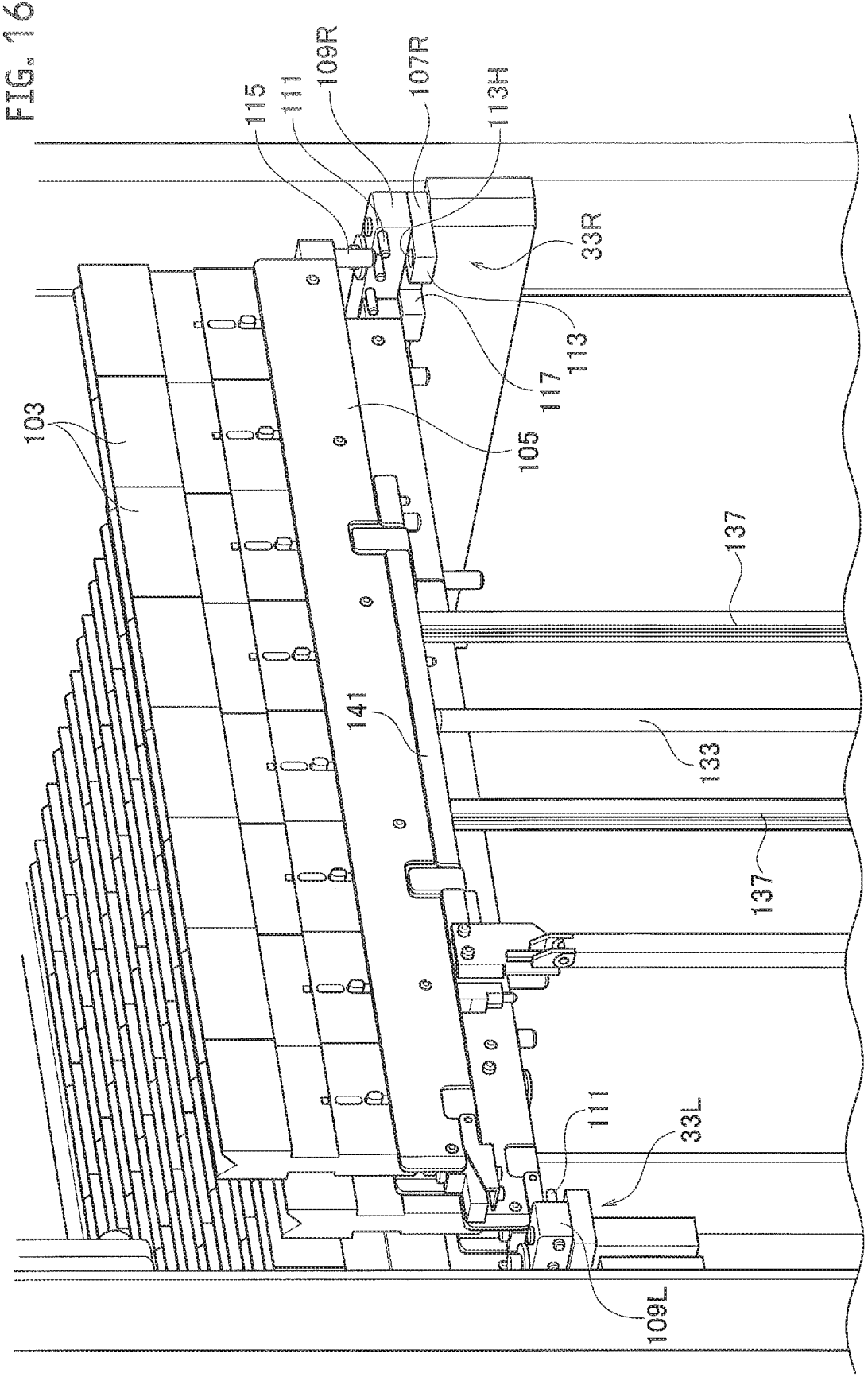
FIG. 16 is a perspective view showing a state where the lower tool holder is lifted up from the lower tool holder support member.

Then, as shown in FIG. 16, the positioning pin 115, provided on the lower tool holder 105, is lifted up above the holder bars 109L and 109R in the lower tool holder support members 33L and 33R, and thereafter, is moved to the recessed portion 117 on the front side or the back side. Thereafter, the lower tool holder holding member 141 is lowered, whereby the lower tool holder 105 can be taken out from the left and right lower tool holder support members 33L and 33R to the lower side.

Figure 17:
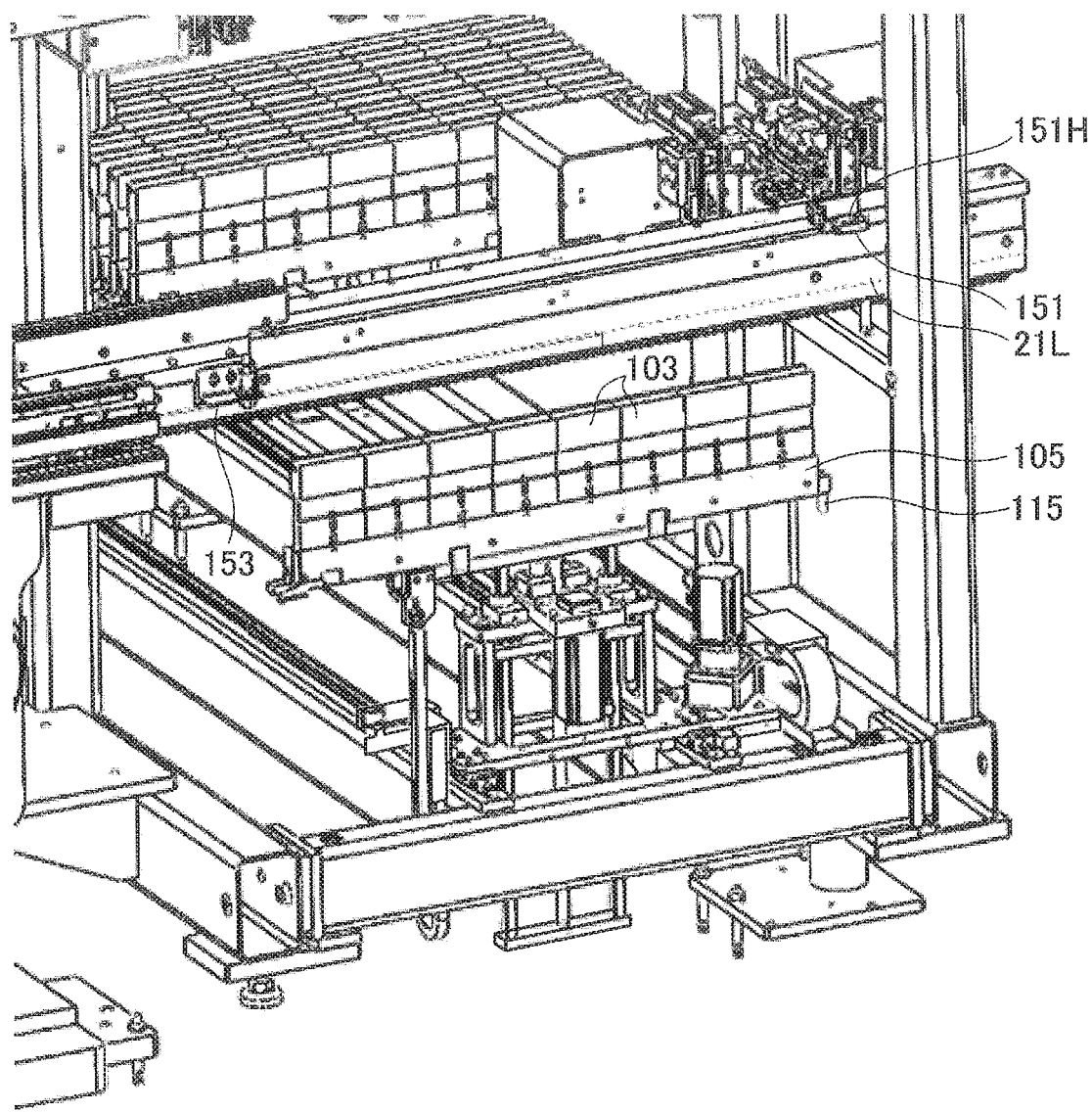
FIG. 17 is a perspective view showing a state where the lower tool holder is conveyed to a front side of the rail extended portion.

As mentioned above, the lower tool holder 105 is taken out from the lower tool holder support members 33L and 33R to the lower side, and thereafter, the slide base 123 is moved to the front side, whereby the lower tool holder 105 can be moved and positioned to the front side of the guide rail extended portion 21L (refer to FIG. 17).

On one end side of the front side of the guide rail extended portion 21L, there is provided a positioning member 151 including a positioning hole 151H that freely enables the positioning pin 115 to engage therewith, the positioning pin 115 being provided on one end side of the lower tool holder 105.

Moreover, on the front side of the guide rail extended portion 21L, an end support member 153 that supports the other end side of the lower tool holder 105 is provided. The positioning member 151 and the end support member 153 need only to have functions to attachably and detachably support one end side and the other end side of the lower tool holder 105, and accordingly, a description of more detailed configurations of the positioning member 151 and the end support member 153 is omitted.

As mentioned above, the lower tool holder 105 is positioned to the front side of the guide rail extended portion 21L, and thereafter, the lower tool holder 105 is lifted up above the positioning member 151 and the end support member 153. Then, in order that both end sides of the lower tool holder 105 can be positioned above the positioning member 151 and the end support member 153, the lower tool holder 105 is moved slightly to the back side.

Thereafter, the lower tool holder 105 is lowered, whereby both end portions of the lower tool holder 105 are supported by the positioning member 151 and the end support member 153. Then, the lower tool holder holding member 141 releases the lower tool holder 105 and is lowered.

As mentioned above, when the positioning member 151 and the end support member 153, which are provided in the guide rail extended portion 21L, are allowed to support both end sides of the lower tool holder 105, the lower tool holder 105 is disposed linearly in the left-and-right direction on the lower tool mounting portion 11 of the lower table 13 in the press brake 3. Hence, by the tool replacement device 19L movable in the left-and-right direction, the attaching and detaching replacement of the lower tool 103 can be performed between the lower tool holder 105 and the lower tool mounting portion 11.

As mentioned above, the lower tool holder holding member 141, which is lowered after supporting both end sides of the lower tool holder 105 by the positioning member 151 and the end support member 153, is moved and positioned backward, and can be thereby positioned to the other desired lower tool holder 105 in which both end portions are supported by the lower tool holder support members 33L and 33R.

Then, in conformity with such operations as mentioned above, the other lower tool holder 105 can be newly taken out from the lower tool holder support members 33L and 33R, and can be conveyed and supported to a lower tool attaching and detaching station 101L (refer to FIG. 2) disposed on the back side of the lower tool holder support members 33L and 33R.

Hence, the attaching and detaching replacement of the lower tool 103 can be manually performed to the other lower tool holder 105 conveyed to and supported on the lower tool attaching and detaching station 101L. That is, even during the folding for the workpiece in the press brake 3, it is possible to easily perform the attaching and detaching replacement of the lower tool 103 to the lower tool holder 105. Hence, the tooling operation of the tools can be performed efficiently.

As understood from such a description as described above, the tool storage device 1 is disposed on the back side of the upper and lower guide rail extended portions 21U and 21L provided in the press brake 3. Hence, even in a case where there is disposed an industrial robot that is movable in the left-and-right direction across a range from the tool storage device 1 to the front side of the press brake 3, the interference between the tool storage device 1 and the industrial robot can be avoided. That is, the motion range of the industrial robot can be increased, and in addition, the degree of freedom thereof can be increased.

Moreover, in the first embodiment, the lower tool holder 105, which holds the desired lower tools 103 in the tool storage device 1 disposed on the side of the press brake 3, is lifted up from the lower tool holder support members 33L and 33R, which support the plurality of lower tool holders 105 that are parallel in the front-and-back direction, and is then moved to the front side or the back side. In the first embodiment, both end sides in the left-and-right direction of the lower tool holder 105 are passed through the engagement recessed portions 117 formed on the lower tool holder support members 33L and 33R, and are then lowered. These operations are defined as step (a) of the tool attaching and detaching replacement method.

Then, in the first embodiment, the lowered lower tool holder 105 is conveyed forward, and is positioned to the same height as that of the lower tool mounting portion 11 in the lower table 13 in the press brake 3. This operation is defined as step (b) of the tool attaching and detaching replacement method.

In the first embodiment, the lower tools 103, held on the lower tool holder 105, are transferred to the lower tool mounting portion 11 of the lower table 13 and mounted on the lower table 13 by the tool replacement device 19L. This operation is defined as a step (c) of the tool attaching and detaching replacement method.

When reverse operations in order of step (c), step (b), and step (a) are performed, the lower tools 103 mounted on the lower table 13 can be returned to the tool storage device 1. This operation is defined as step (d) of the tool attaching and detaching replacement method.

Hence, the upper tools 39 supported on the upper tool holder support members 31L and 31R and the lower tools 103 supported on the lower tool holder support members 33L and 33R can be brought into close contact with each other in the tool storage device 1. Hence, the size of such a storage portion for the upper and lower tools 39 and 103 can be reduced.

Moreover, the tool storage device 1 is provided with the following configuration. The tool storage device 1 includes the upper tool holder support members 31L and 31R, which hold the plurality of upper tool holders 37 and are long in the left-and-right direction, and are parallel with one another in the front-and-back direction. The upper tool holder support members 31L and 31R hold the upper tools 39 so that the upper tools 39 can be subjected to the attaching and detaching replacement, the upper tools 39 being mounted on the upper tool mounting portion 17 provided on the upper table 15 in the press brake 3.

The tool storage device 1 includes the upper tool holder conveying mechanism 51, which is freely capable of lifting up the desired upper tool holder 37 from the upper tool holder support members 31L and 31R, conveying the upper tool holder 37 forward, and positioning the upper tool holder 37 to the side position of the upper tool mounting portion 17.

The tool storage device 1 includes the lower tool holder support members 33L and 33R, which hold the plurality of lower tool holders 105, are long in the left-and-right direction, and are parallel with one another in the front-and-back direction. The lower tool holder support members 33L and 33R. hold the lower tools 103 so that the lower tools 103 can be subjected to the attaching and detaching replacement, the lower tools 103 being mounted on the lower tool mounting portion 11 provided on the lower table 13 in the press brake 3.

The tool storage device 1 includes the lower tool holder conveying mechanism 119, which is freely capable of lifting up the desired lower tool holder 105 from the lower tool holder support members 33L and 33R, conveying the lower tool holder 105 forward, and positioning the lower tool holder 105 to the side position of the lower tool mounting portion 11.

The lower tool holder support members 33L, and 33R in the tool storage device 1 include the recessed portions 117, through which both end sides of the lower tool holder 105 are freely passable in the up-and-down direction, on the front side or back side of the protruding portions 113 which support both end sides in the left-and-right direction in the lower tool holder 105.

On the back side of the upper tool holder support members 31L and 31R, the tool storage device 1 includes the upper tool attaching and detaching station 101U for performing the attaching and detaching replacement of the upper tools 39 to the upper tool holder 37. On the back side of the lower tool holder support members 33L, and 33R, the tool storage device 1 includes the lower tool attaching and detaching station 101L for performing the attaching and detaching replacement of the lower tools 103 to the lower tool holder 105.

Hence, without allowing the upper and lower tools 39 and 103 to protrude forward from the tool storage device 1, the attaching and detaching replacement of the upper and lower tools 39 and 103 can be performed to the press brake 3. Moreover, even while the workpiece is being folded in the press brake 3, the attaching and detaching replacement of the tools 39 and 103 can be performed to the upper tool holder 37 and the lower tool holder 105. Hence, the tooling operation of the tools can be performed efficiently.

Note that the present invention is not limited to only the first embodiment as mentioned above, and is capable of being embodied in other configurations by being modified as appropriate. For example, the lower tool holder conveying mechanism 119 may be disposed at an intermediate height position between the upper tool holder support members 31L and 31R, and the lower tool holder support members 33L and 33R, so as to be freely capable of being moved and positioned in the front-and-back direction.

Then, it is also possible to configure the lower tool holder holding member 141, which supports the lower tool holder 105 from the lower side, so that the lower tool holder holding member 141 can be freely lowered between the lower tool holders 105 arrayed parallel in the front-and-back direction, and to adopt a configuration of picking up (hooking and lifting up) the lower tool holder 105 by the lowered lower tool holder holding member 141.

Figure 18:
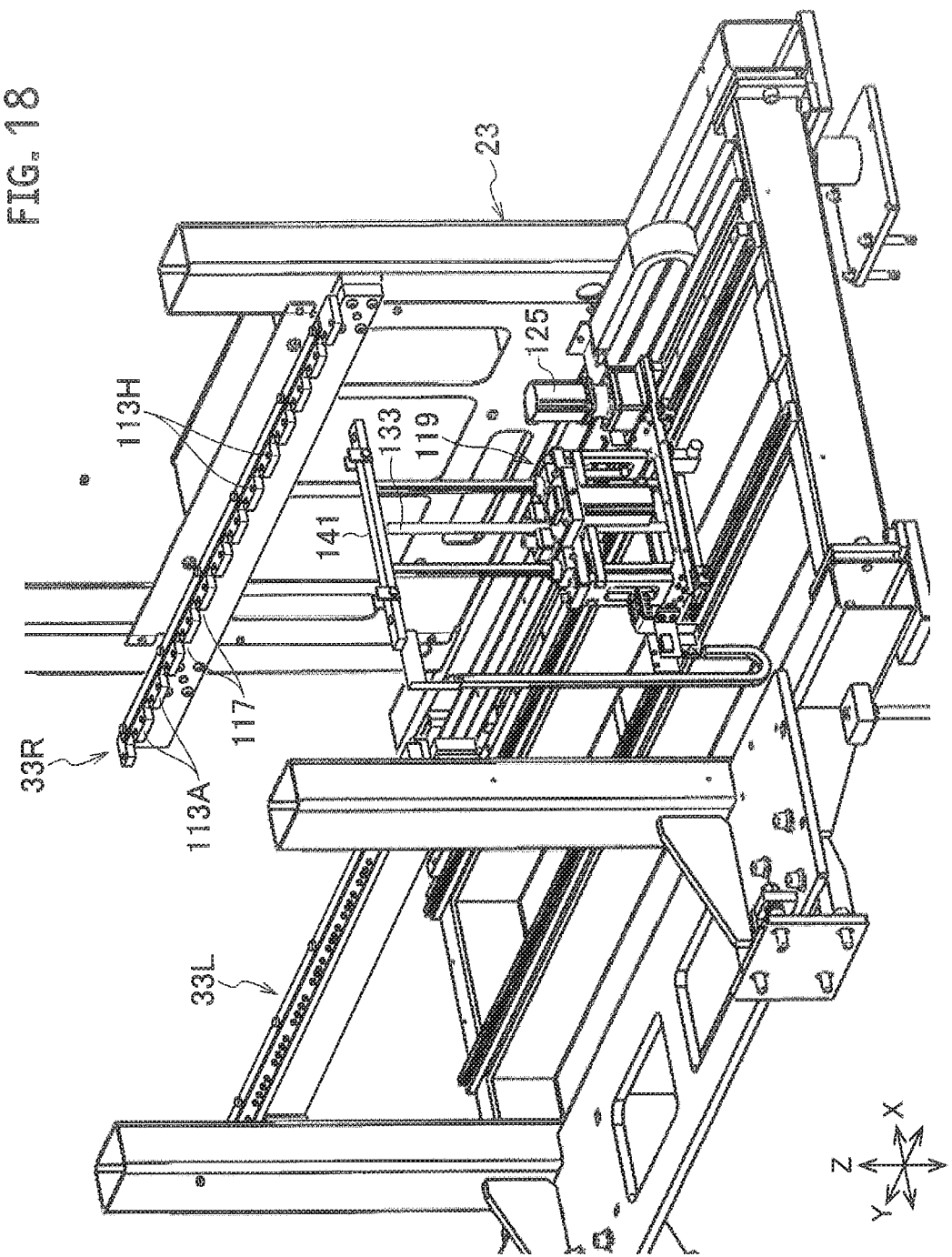
FIG. 18 is a perspective view showing a second embodiment of the lower tool holder support member.
Figure 19:
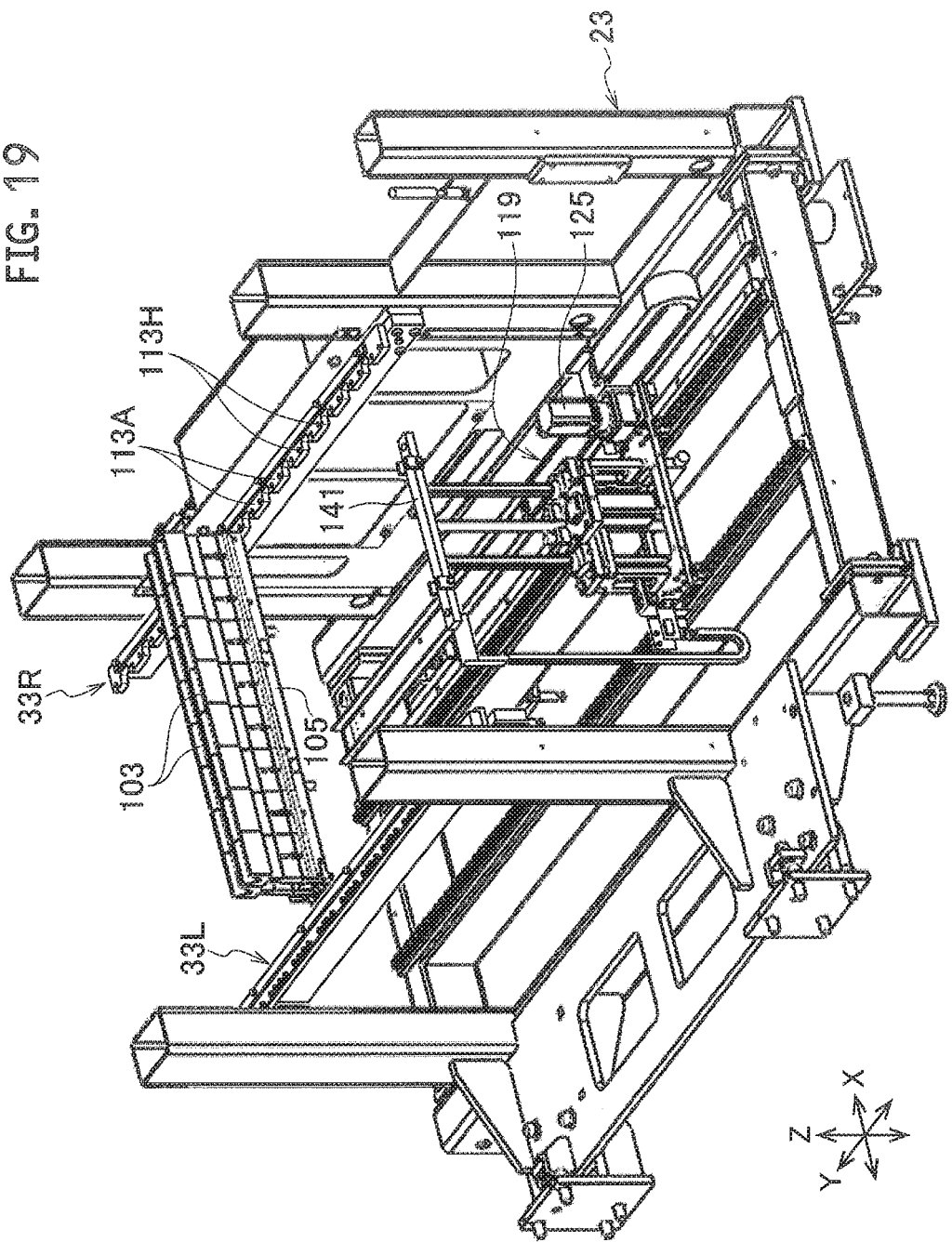
FIG. 19 is a perspective view showing the second embodiment of the lower tool holder support member.
Figure 20:
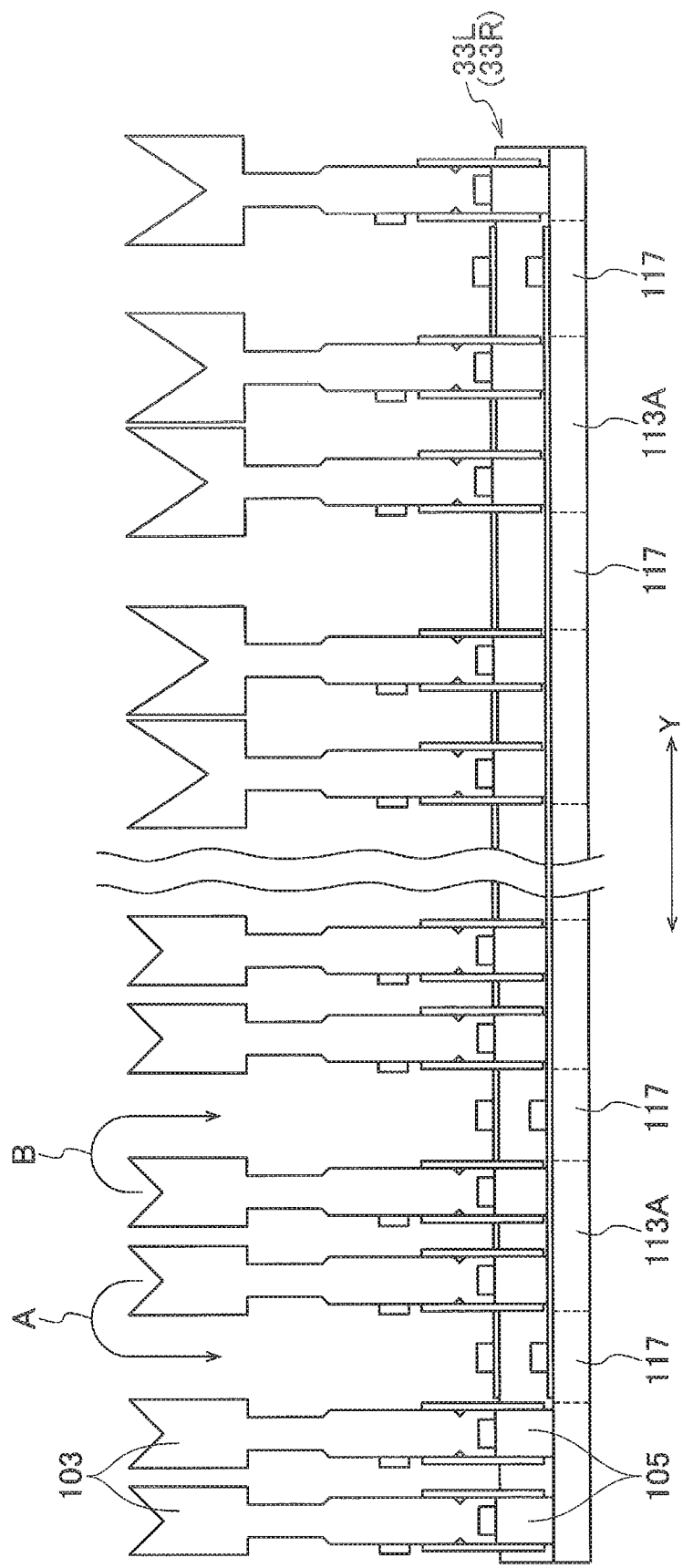
FIG. 20 is a side view showing a state of grouping and supporting the lower tool holders.

FIGS. 18 to 20 show a second embodiment of the lower tool holder support members 33L and 33R, which support both the left and right end sides of the lower tool holders 105 in the base frame 23. The first embodiment has the configuration of including the inward-protruding portions 113 and the recessed portions 117 alternately with each other in the front-and-back direction, the protruding portions 113 serving as the support portions (the end portion holding regions), which support both end sides of the lower tool holders 105, and the recessed portion freely enabling both end sides of the lower tool holders 105 to pass therethrough in the up-and-down direction.

In contrast to the above-described configuration, the second embodiment has a configuration in which the front and back lower tool holders 105 are brought into close contact with each other and are grouped, while protruding portions 113A as support portions which support both the left and right end sides of the two grouped lower tool holders 105 are provided on the left and right lower tool holder support members 33L and 33R, and the protruding portions 113A and the recessed portions 117 are provided alternately with each other in the front-and-back direction.

As mentioned above, the protruding portions 113A support the two grouped lower tool holders 105, and accordingly, the protruding, portions 113A are formed so that a width thereof in the front-and-back direction can be larger than the width in the front-and-back direction of the protruding portions 113 in the first embodiment. In each of the protruding portions 113A, two positioning holes 113H are provided so as to be spaced apart from each other in the front-and-back direction, in order to support the two lower tool holders 105.

Note that the protruding portions in the lower tool holder support member 33L on the left side have a similar configuration to that of the protruding members in the first embodiment, and are configured so that a width dimension thereof in the front-and-back direction can be equal to a width dimension of the protruding portions 113A.

As understood from the above description, each of the protruding portions 113A in the lower tool holder support members 33L and 33R support the two lower tool holders 105 on the front and back sides, which are brought into close contact with each other. Hence, in the case where the lower tool holder 105 on the front side, which is supported on the protruding portion 113A, is lifted up by the lower tool holder holding member 141 in the lower tool holder conveying mechanism 119, then as shown by arrow A of FIG. 20, the lower tool holder 105 moves forward, passes through the recessed portion 117 on the front side, and is lowered. Moreover, in the case where the lower tool holder 105 on the backside is lifted up by the lower tool holder holding member 141, then as shown by arrow B of FIG. 20, the lower tool holder 105 moves backward, passes through the recessed portion 117 on the back side, and is lowered.

As understood from the above description, in accordance with the second embodiment, the two lower tool holders 105, which are grouped and arrayed in the front-and-back. direction, are supported on each of the protruding portions 113A in the lower tool holder support members 33L and 33R. In the above-described group, the lower tool holder 105 on the front side is lowered after passing through the recessed portion 117 on the front side, and the lower tool holder 105 on the back side is lowered after passing through the recessed portion 117 on the back side.

Hence, the lower tool holder 105, which is supported on a front side of the protruding portions 113A adjacent forward and backward to each other, and the lower tool holder 105, which is supported on a back side thereof, are lowered after passing through the recessed portion 117 common thereto. That is, one recessed portion is used commonly, and accordingly, a large number of the lower tool holders 105 can be supported on the lower tool holder support members 33L, and 33R.

INDUSTRIAL APPLICABILITY

The tool attaching and detaching replacement method of the press brake according to the present invention can be used in the case of replacing the tool for folding the workpiece by the press brake. The tool storage device of the present invention can be used in the event of storing the tool for folding the workpiece by the press brake.

The invention claimed is:

1. A tool storage device for storing therein a plurality of tools used for a press brake which comprises an upper table and a lower table, wherein each table has a longitudinally extending surface, the upper table being movable in an up-and-down direction, the up-and-down direction being defined as a Z-axis direction, a left-and-right direction of the press brake orthogonal to the Z-axis direction and parallel to the longitudinally extending surface of each of the upper and lower tables being defined as an X-axis direction, and a front-and-back direction orthogonal to the X-axis and Z-axis directions being defined as a Y-axis direction, the tool storage device being disposed on a side of a press brake in the X-axis direction, the tool storage device comprising:

an upper tool holder support member configured to support a plurality of upper tool holders parallel with one another in the Y-axis direction, the upper tool holders holding upper tools to be mounted on an upper tool mounting portion, which is provided on the upper table, so that the upper tools can be subjected to attaching and detaching replacement;

an upper tool holder conveying mechanism, which is freely capable of lifting up a desired upper tool holder from the upper tool holder support member, conveying the upper tool holder forward in the Y-axis direction, and positioning the upper tool holder to a side position of the upper tool mounting portion in the X-axis direction;

a lower tool holder support member configured to support a plurality of lower tool holders parallel with one another in the Y-axis direction, the lower tool holders holding lower tools to be mounted on a lower tool mounting portion, which is provided on the lower table, so that the lower tools can be subjected to the attaching and detaching replacement; and a lower tool holder conveying mechanism, which is freely capable of individually lifting up a desired lower tool holder from the lower tool holder support member, individually conveying the lower tool holder forward in the Y-axis direction, and individually positioning the lower tool holder to a side position of the lower tool mounting portion in the X-axis direction, wherein the lower tool holder support member comprises recessed portions, through which both end sides in the X-axis direction of the lower tool holder are freely passable in the Z-axis direction, on a front side or back side of support portions which support both end sides in the X-axis direction in the lower tool holder.

2. The tool storage device according to claim 1, wherein two lower tool holders in the plurality of lower tool holders are grouped, the two lower tool holders being brought into close contact with each other in the Y-axis direction, and the lower tool holder support member comprises: support portions which support both end sides in the X-axis direction in the grouped two lower tool holders; and recessed portions, through which both end sides in the X-axis direction in the lower tool holders are freely passable in the Z-axis direction, the recessed portions being provided on the front side or back side of the support portions.

3. The tool storage device according to claim 1, further comprising:

an upper tool attaching and detaching station for performing the attaching and detaching replacement of the upper tools to the upper tool holder, the upper tool attaching and detaching station being disposed on a back side of the upper tool holder support member in the Y-axis direction; and a lower tool attaching and detaching station for performing the attaching and detaching replacement of the lower tools to the lower tool holder, the lower tool attaching and detaching station being disposed on a back side of the lower tool holder support member in the Y-axis direction.

4. The tool storage device according to claim 1, wherein the upper tool holders comprise front and back indicators, and the upper tool holder conveying mechanism comprises:
- an upper tool holder holding member that holds the upper tool holders; and
- a turning mechanism that horizontally turns the upper tool holder holding member in order to invert a front and back of the upper tool holder,
- wherein the upper tool holder holding member comprises a front and back detection mechanism that detects the front and back indicators.

5. The tool storage device according to claim 4, wherein the upper tool holder comprises positioning pins on both end sides in the X-axis direction, and
the upper tool holder holding member comprises centering mechanisms on both end sides in the X-axis direction, the centering mechanisms being capable of engaging with the positioning pins.

\* \* \* \* \*